United States Patent
Kohno et al.

(10) Patent No.: US 9,697,365 B2
(45) Date of Patent: Jul. 4, 2017

(54) WORLD-DRIVEN ACCESS CONTROL USING TRUSTED CERTIFICATES

(71) Applicant: Microsoft Corporation, Redmond, WA (US)

(72) Inventors: Tadayoshi Kohno, Seattle, WA (US); David A. Molnar, Seattle, WA (US); Alexander N. Moshchuk, Kirkland, WA (US); Franziska Roesner, Seattle, WA (US); Jiahe Helen Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/166,774

(22) Filed: Jan. 28, 2014

(65) Prior Publication Data
US 2015/0074746 A1    Mar. 12, 2015

Related U.S. Application Data

(63) Continuation-in-part of application No. 14/020,735, filed on Sep. 6, 2013.

(51) Int. Cl.
*H04L 29/06* (2006.01)
*G06F 21/60* (2013.01)
(Continued)

(52) U.S. Cl.
CPC ............ *G06F 21/60* (2013.01); *G06F 21/34* (2013.01); *G06F 21/6245* (2013.01);
(Continued)

(58) Field of Classification Search
CPC ........................ H04L 63/0823; H04L 63/20
(Continued)

(56) References Cited

U.S. PATENT DOCUMENTS 6,085,976 A *  7/2000  Sehr ............................. 235/384
7,693,545 B2    4/2010  Park
(Continued)

FOREIGN PATENT DOCUMENTS

WO    WO2009145730 A1    12/2009

OTHER PUBLICATIONS

Labati, "Biometric Recognition in Automated Border Control: A Survey", Jun. 2016, ACM, p. 1-39.*

(Continued)

*Primary Examiner* — Taghi Arani
*Assistant Examiner* — Gregory Lane
(74) *Attorney, Agent, or Firm* — Rainier Patents, P.S.

(57) ABSTRACT

Functionality is described herein for receiving events which characterize features in an environment, and for identifying at least one policy based on the events. The functionality consults a certificate, associated with the policy, to determine whether the policy is valid. If valid, the functionality uses the policy to govern the behavior of at least one application, such as by controlling the application's consumption of events. A trusted passport authority may be employed to generate the certificates. Each certificate may: (1) identify that it originated from the trusted passport authority; (2) contain context information which describes a context in which the policy is intended to be applied within an environment; and/or (3) contain machine-readable content that, when executed, carries out at least one aspect of the policy.

20 Claims, 15 Drawing Sheets

(51) Int. Cl.
*G06F 21/34* (2013.01)
*G06F 21/62* (2013.01)

(52) U.S. Cl.
CPC ........ *H04L 63/0823* (2013.01); *H04L 63/102* (2013.01); *H04L 63/107* (2013.01)

(58) Field of Classification Search
USPC .......................................................... 726/1
See application file for complete search history.

(56) References Cited

U.S. PATENT DOCUMENTS

| | | | |
|---|---|---|---|
| 7,706,837 B2 | 4/2010 | Ladouceur | |
| 7,856,652 B2 | 12/2010 | Hieda | |
| 7,996,879 B1* | 8/2011 | Fang et al. ........................ | 726/1 |
| 8,219,144 B2 | 7/2012 | Benco et al. | |
| 8,254,902 B2 | 8/2012 | Bell et al. | |
| 8,326,272 B1* | 12/2012 | Patro ...................... | H04L 41/18 455/405 |
| 8,331,739 B1 | 12/2012 | Abdulkader et al. | |
| 8,719,605 B2* | 5/2014 | Chakra ................. | G06F 1/3206 345/173 |
| 8,732,619 B2 | 5/2014 | Knitowski et al. | |
| 8,744,143 B2 | 6/2014 | Chen | |
| 2001/0044775 A1* | 11/2001 | Saito et al. ...................... | 705/40 |
| 2003/0081621 A1* | 5/2003 | Godfrey et al. ............. | 370/400 |
| 2004/0267410 A1 | 12/2004 | Duri et al. | |
| 2006/0004581 A1* | 1/2006 | Claudatos .......... | G08B 13/1672 704/275 |
| 2006/0048142 A1* | 3/2006 | Roese ................. | H04L 41/0893 717/176 |
| 2006/0064384 A1 | 3/2006 | Mehrotra et al. | |
| 2007/0162966 A1* | 7/2007 | Agrawal ............... | H04L 63/102 726/6 |
| 2007/0250410 A1 | 10/2007 | Brignone et al. | |
| 2008/0016335 A1* | 1/2008 | Takahashi ............. | H04L 9/3263 713/156 |
| 2008/0180243 A1 | 7/2008 | Aaron | |
| 2008/0307527 A1* | 12/2008 | Kaczmarski et al. .......... | 726/24 |
| 2009/0141940 A1 | 6/2009 | Zhao et al. | |
| 2009/0259591 A1* | 10/2009 | Starostin et al. ............... | 705/59 |
| 2009/0313254 A1 | 12/2009 | Mattox, Jr. et al. | |
| 2009/0322890 A1 | 12/2009 | Bocking et al. | |
| 2010/0040288 A1 | 2/2010 | Yen et al. | |
| 2010/0077484 A1* | 3/2010 | Paretti ................. | G06F 21/6245 726/26 |
| 2010/0107220 A1* | 4/2010 | Nguyen ............................ | 726/3 |
| 2010/0211666 A1* | 8/2010 | Kvernvik ............ | H04L 41/0681 709/223 |
| 2010/0226535 A1 | 9/2010 | Kimchi et al. | |
| 2010/0235519 A1* | 9/2010 | Hu et al. ........................ | 709/227 |
| 2011/0143811 A1 | 6/2011 | Rodriguez | |
| 2012/0019683 A1 | 1/2012 | Susanu et al. | |
| 2012/0042076 A1* | 2/2012 | Kawa ........................ | G06F 9/50 709/226 |
| 2012/0069051 A1 | 3/2012 | Hagbi et al. | |
| 2012/0192247 A1* | 7/2012 | Oliver ................. | G06F 21/6245 726/1 |
| 2012/0218296 A1 | 8/2012 | Belimpasakis et al. | |
| 2012/0222083 A1* | 8/2012 | V h -Sipil et al. ............... | 726/1 |
| 2012/0249741 A1 | 10/2012 | Maciocci et al. | |
| 2012/0311131 A1 | 12/2012 | Arrasvuori | |
| 2012/0311708 A1* | 12/2012 | Agarwal et al. ................ | 726/24 |
| 2013/0044128 A1 | 2/2013 | Liu et al. | |
| 2013/0050262 A1 | 2/2013 | Jeon | |
| 2013/0117840 A1 | 5/2013 | Roesner et al. | |
| 2013/0132084 A1 | 5/2013 | Stonehocker et al. | |
| 2013/0239192 A1 | 9/2013 | Linga et al. | |
| 2013/0263016 A1 | 10/2013 | Lehtiniemi et al. | |
| 2013/0303077 A1* | 11/2013 | Ohmata ................. | H04H 20/59 455/3.01 |
| 2014/0009609 A1 | 1/2014 | Webster et al. | |
| 2014/0196152 A1 | 7/2014 | Ur et al. | |
| 2014/0282840 A1* | 9/2014 | Guinan ............................ | 726/1 |
| 2015/0071555 A1 | 3/2015 | D'Antoni et al. | |
| 2015/0074506 A1 | 3/2015 | Dunn et al. | |
| 2015/0074742 A1 | 3/2015 | Kohno et al. | |

OTHER PUBLICATIONS

Jana, et al., "A Scanner Darkly: Protecting User Privacy from Perceptual Applications," In Proceedings of the 2013 IEEE Symposium on Security and Privacy, May 19, 2013, 15 pages.

Ferreira, et al., "Security and Privacy in a Middleware for Large Scale Mobile and Pervasive Augmented Reality," In 15th International Conference on Software, Telecommunications and Computer Networks, Sep. 2007, 5 pages.

"Augmented Reality and Privacy," available at http://www.arlab.com/blog/augmented-reality-and-privacy/, Augmented Reality Lab S.L., Madrid, Spain, accessed on Jun. 5, 2013, 4 pages.

Friedman, et al., "New Directions: A Value-Sensitive Design Approach to Augmented Reality," In Proceedings of DARE 2000 on Designing Augmented Reality Environments, 2000, 2 pages.

Aryan, et al., "Securing Location Privacy in Augmented Reality," In 5th International Conference on Industrial and Information Systems, Jul. 29, 2010, 5 pages.

Szalavari, et al., "Collaborative Gaming in Augmented Reality," In Proceedings of the ACM Symposium on Virtual Reality Software and Technology, 1998, 10 pages.

Azuma, Ronald T. "A Survey of Augmented Reality," In Presence: Teleoperators and Virtual Environments, vol. 6, Issue 4, Aug. 1997, 48 pages.

Azuma, et al., "Recent Advances in Augmented Reality," In IEEE Computer Graphics and Applications, vol. 21, Issue 6, Nov. 2001, 14 pages.

Beresford, et al., "MockDroid: Trading Privacy for Application Functionality on Smartphones," In Proceedings of the 12th Workshop on Mobile Computing Systems and Applications, Mar. 2011, 6 pages.

Chu, et al., "Mobile Apps: It's Time to Move Up to CondOS," In Proceedings of the 13th Workshop on Hot Topics in Operating Systems, May 2011, 5 pages.

"Kinect for Xbox 360 Privacy Considerations," available at <<http://www.microsoft.com/privacy/technologies/kinect.aspx>>, accessed on Aug. 7, 2013, Microsoft Corporation, Redmond, WA, 1 page.

"Kinect for Windows SDK," available at <<http://www.microsoft.com/en-us/kinectforwindows/develop/new.aspx>>, accessed on Aug. 7, 2013, Microsoft Corporation, Redmond, WA, 1 page.

Dwork, Cynthia, "The Differential Privacy Frontier," In Proceedings of the 6th Theory of Cryptography Conference on Theory of Cryptography, Mar. 2009, 7 pages.

Enck, et al., "TaintDroid: An Information-Flow Tracking System for Realtime Privacy Monitoring on Smartphones," In Proceedings of 9th USENIX Symposium on Operating Systems Design and Implementation, Oct. 2010, 15 pages.

Felt, et al., "Android Permissions: User Attention, Comprehension, and Behavior," In Proceedings of the Eighth Symposium on Usable Privacy and Security, Article No. 3, Jul. 2012, 14 pages.

"OpenCV," available at <<http://opencv.orgiabout.html>>, accessed on Aug. 7, 2013, 2 pages.

Guha, et al., "Koi: A Location-Privacy Platform for Smartphone Apps," In Proceedings of 9th USENIX Symposium on Networked Systems Design and Implementation, Apr. 2012, 14 pages.

Hornyack, et al., "These Aren't the Droids You're Looking for: Retrofitting Android to Protect Data from Imperious Applications," In Proceedings of the 18th ACM Conference on Computer and Communications Security, Oct. 2011, 13 pages.

Howell, et al., "What You See is What They Get: Protecting Users from Unwanted Use of Microphones, Cameras, and Other Sensors," In Proceedings of the Web 2.0 Security and Privacy Workshop, May 2010, 9 pages.

Hutchings, Emma, "Augmented Reality Lets Shoppers See How New Furniture Would at Home," available at <<http://www.psfk.com/2012/05/augmenred-reality-furniture-app.html>>, PSFK Labs, New York, NY, May 18, 2012, 3 pages.

(56) References Cited

OTHER PUBLICATIONS

Krumm, John, "A Survey of Computational Location Privacy," In Personal and Ubiquitous Computing, vol. 13, Issue 6, Aug. 2009, 9 pages.
"What is Layar," available at <<http://www.layarcom/what-is-layar/>>, accessed on Aug. 7, 2013, Layar US, New York, NY, 2 pages.
"Microsoft Research Face SDK Beta," available at <<http://research.microsoft.com/en-us/projects/facesdk/>>, accessed on Aug. 7, 2013, Microsoft Corporation, Redmond, WA, 2 pages.
"Microsoft Speech Platform," available at at <<http://msdn.microsoft.com/en-us/library/hh361572(v=office.14).aspx>>, accessed on Aug. 7, 2013, Microsoft Corporation, Redmond, WA, 3 pages.
Newcombe, et al., "KinectFusion: Real-Time Dense Surface Mapping and Tracking," In Proceedings of the 10th IEEE International Symposium on Mixed and Augmented Reality, Oct. 2011, 10 pages.
Poh, et al., "Advancements in Noncontact, Multiparameter Physiological Measurements Using a Webcam," In IEEE Transactions on of Biomedical Engineering, vol. 58, Issue 1, Jan. 2011, 5 pages.
"Google Glass," available at <<http://en.wikipedia.org/wiki/Google_Glass, accessed on Aug. 7, 2013, Wikipedia article, 6 pages.
"Qualcomm Vuforia," available at <<http://www.qualcomm.com/solutions/augmented-reality>>, accessed on Aug. 7, 2013, QUALCOMM Incorporated, San Diego, CA, 2 pages.
Roesner, et al., "User-Driven Access Control: Rethinking Permission Granting in Modern Operating Systems," In Microsoft Technical Report No. MSR-TR-2011-91, Microsoft Corporation, Redmond, WA, Aug. 2011, 16 pages.
Shotton, et al., "Real-time Human Pose Recognition in Parts from a Single Depth Image," In Proceedings of the 24th IEEE Conference on Computer Vision and Pattern Recognition, Jun. 2011, 8 pages.
"Instantl.y Survey Creator," available at <<http://www.instant.ly/>>, accessed on Jun. 4, 2013, United Sample, Encino, CA, 4 pages.
Viola, et al., "Robust Real-time Object Detection," In International Journal of Computer Vision, vol. 57, Issue 2, May 2004, 18 pages.
Abrash, Michael, "Latency—The sine qua non of AR and VR," available at <<http://blogs.valvesoftware.com/abrash/latency-the-sine-qua-non-of-ar-and-vr/>>, Ramblings in Valve Time, a blog by Michael Abrash, Dec. 29, 2012, 80 pages.
Aiken, et al., "Deconstructing Process Isolation," In Proceedings of the 2006 Workshop on Memory System Performance and Correctness, Oct. 22, 2006, 10 pages.
D'Antoni, et al., "FAST: A Transducer-Based Language for Tree Manipulation," In Microsoft Research Technical Report No. MSR-TR-2012-123, Microsoft Corporation, Redmond, WA, Nov. 2012, 11 pages.
Dowty, et al., "GPU Virtualization on VMware's Hosted I/O Architecture," In USENIX Workshop on I/O Virtualization, Dec. 2008, 8 pages.
Engler, et al., "Exterminate all Operating System Abstractions," In Proceedings of the Fifth Workshop on Hot Topics in Operating Systems, May 1995, 6 pages.
Felt, et al., "How to Ask for Permission," In Proceedings of the 7th USENIX Conference on Hot Topics in Security, Aug. 2012, 6 pages.
"Clickjacking," available at <<http://ha.ckers.org/blog/20080915/clickjacking/>>, accessed on Jun. 5, 2013, 11 pages.
Gauger, Eliza, "Sonic-Style Grey Goo Cripples Second Life," available e at <<http://www.wired.com/gamelife/2006/11/sonicstyle_grey/, Wired Magazine, Nov. 21, 2006, 4 pages.
Kaashoek, et al., "Application Performance and Flexibility on Exokernel Systems," In Proceedings of the Sixteenth ACM Symposium on Operating Systems Principles, 2007, 14 pages.
"Grey Goo Fence," available at <<http://lslwiki.net/lslwiki/wakka.php?wakka=GreyGooFence>>, accessed on Aug. 7, 2013, LSL Wiki, 2 pages.
Poulsen, Kevin, "Hackers Assault Epilepsy Patients via Computer," available at <<http://www.wired.com/politics/security/news/2008/03/epilepsy>>, WIRED magazine, Mar. 28, 2008, 1 page.

Nightingale, et al., "Helios: Heterogeneous Multiprocessing with Satellite Kernels," In Proceedings of the ACM SIGOPS 22nd Symposium on Operating Systems Principles, Oct. 2009, 14 pages.
Roesner, et al., "User-Driven Access Control: Rethinking Permission Granting in Modern Operating Systems," In Proceedings of the IEEE Symposium on Security and Privacy, May 20, 2012, 15 pages.
"About Willow Garage," available at <<http://www.willowgarage.com/pp./about-us>>, accessed on Aug. 7, 2013, Willow Garage, Inc., Menlo Park, CA, 2 pages.
Viola, et al., "Robust Real-time Object Detection," In Technical Report No. CRL 2001/01, Compaq Computer Corporation, Cambridge, MA, Feb. 2001, 30 pages.
"Willow Garage," available at <<http://en.wikipedia.org/wi ki/Willow_Garage>>, accessed on Aug. 7, 2013, Wikipedia article, 4 pages.
Namee, et al., "Motion in Augmented Reality Games: An Engine for Creating Plausible Physical Interactions in Augmented Reality Games," In International Journal of Computer Games Technology, vol. 2010, Article No. 4, Jan. 2010, 8 pages.
D'Antoni, et al., "Operating System Support for Augmented Reality Applications," In Proceedings of the 14th Workshop on Hot Topics in Operating Systems (HotOS), May 2013, 7 pages.
Sherstyuk, et at., "Virtual Roommates in Multiple Shared Spaces," In Proceedings of the IEEE International Symposium on VR Innovation, Mar. 19, 2011, 8 pages.
Grasset, et al., "Image-Driven View Management for Augmented Reality Browsers," In Proceedings of the IEEE International Symposium on Mixed and Augmented Reality, Nov. 2012, 10 pages.
Kaufmann, et al., "Simulating Educational Physical Experiments in Augmented Reality," In Proceedings of ACM SIGGRAPH ASIA Educators Programme, Dec. 2008, Article No. 3, 8 pages.
Lang, et al., "Massively Multiplayer Online Worlds as a Platform for Augmented Reality Experiences," In Proceedings of the IEEE Virtual Reality Conference, Mar. 2008, 4 pages.
"Method and System for Disabling Camera Feature of a Mobile Device," availalbe at <<http://www.ibridgenetwork.org/nanyangpolytechnic/method-and-system-for-disabling-camera-feature-of-a-mobile-de>>, ibridge, Nanyang Polytechnic, Singapore, posted on Jun. 18, 2002, 1 page.
Roesner, et al., "Providing Intent-Based Access to User-Owned Resources," U.S. Appl. No. 13/368,334, filed Feb. 8, 2012, 80 pages.
"Layar Catalogue," available at <<http://www.layar.com/layers/>>, accessed on Aug. 7, 2013, Layar U.S., New York, NY, 5 pages.
"Project Glass," available at <<https://plus.google.com/+projectglass/posts>>, accessed on Jun. 4, 2013, Google Inc., Googleplex, California, 10 pages.
Ardagna, et al., "Privacy-enhanced Location-based Access Control," In Handbook of Database Security, 2008, 22 pages.
Barton, et al., Letter from the U.S. Congress Bi-Partisan Privacy Caucus to Larry Page, regarding Google Glass, available at <<http://joebarton.house.gov/images/GoogleGlassLtr_051613.pdf, May 2013, 3 pages.
Baur, et al., "Device-enabled Authorization in the Grey System," In Proceedings of the 8th International Conference on Information Security, 2005, 15 pages.
Brassil, Jack, "Technical Challenges in Location-Aware Video Surveillance Privacy," In HP Laboratories, Report No. HPL-2008-213, Hewlett-Packard, Palo Alto, CA, 23 pages.
Cammozzo, Alberto, "What is TagMeNot?," available at <<http://tagmenot.info/>>, accessed on Aug. 7, 2013, 2 pages.
Halderman, et al., "Privacy Management for Portable Recording Devices," In Proceedings of the 2004 ACM Workshop on Privacy in the Electronic Society, 2004, 9 pages.
Hurst, Mark, "The Google Glass feature no one is talking about," available at <<http://creativegood.com/blog/the-google-glass-feature-no-one-is-talking-about/>>, creative good, Feb. 28, 2013, 35 pages.
Jana, et al., "Fine Grained Permissions for Augmented Reality Applications," In Microsoft Technical Report No. MSR-TR-2013-11, Microsoft Corporation, Redmond, WA, Feb. 2013, 1 page.
"Convergence Beta," available at <<http://convergence.io/>>, Thoughtcrime Labs Production, accessed on Aug. 7, 2013, 1 page.

(56) References Cited

OTHER PUBLICATIONS

"Convergence Beta Details," available at <<http://convergence.io/details.html>>, Thoughtcrime Labs Production, accessed on Aug. 7, 2013, 2 pages.
Patel, et al., "BlindSpot: Creating Capture-Resistant Spaces," In Protecting Privacy in Video Surveillance, A. Senior (Ed.), Springer-Verlag, 2009, 17 pages.
Schiff, et al., "Respectful Cameras: Detecting Visual Markers in Real-Time to Address Privacy Concerns," In IROS 2007, IEEE/RSJ International Conference on Intelligent Robots and Systems, Oct. 2007, 8 pages.
Starner, Thad, "The Challenges of Wearable Computing: Part 2," In IEEE Micro, vol. 21, No. 4, 2001, 14 pages.
Murphy, David, "Seattle Bar Bans Google Glass. Who's Next?," available at <<http://www.pcmag.com/article2/0,2817,2416421,00.asp>>, pcmag.com, Mar. 9, 2013, 5 pages.
D'Antoni, et al., "Managing Access by Applications to Perceptual Information," U.S. Appl. No. 14/020,708, filed Sep. 6, 2013, 85 pages.
Dunn, et al., "Managing Shared State Information Produced by Applications," U.S. Appl. No. 14/020,723, filed Sep. 6, 2013, 85 pages.
Jana, et al., "Enabling Fine-Grained Permissions for Augmented Reality Applications with Recognizers," In Proceedings of the 22nd USENIX Security Symposium, Aug. 14, 2013, 17 pages.
Vidas, et al., "QRishing: The Susceptibility of Smartphone Users to QR Code Phishing Attacks," In Report No. CMU-CyLab-12-022, Carnegie Mellon University, Pittsburgh, PA, Nov. 2012, 13 pages.
PCT Search Report and Written Opinion for PCT/US2014/053963, mailed on Dec. 1, 2014, 12 pages.
PCT Search Report and Written Opinion for PCT/US2014/053771, mailed on Dec. 1, 2014, 14 pages.
Beresford, Alastair R., "Location Privacy in Ubiquitous Computing," Technical Report No. 612, University of Cambridge, Computer Laboratory, Jan. 2005, retrieved at http://www.cl.cam.ac.uk/research/dtg/www/publications/public/arb33/UCAM-CL-TR-612.pdf, 139 pages.
Dabrowski, et al., "Framework based on Privacy Policy Hiding for Preventing Unauthorized Face Image Processing," IEEE, Nov. 20, 2013, Retrieved at http://www.iseclab.org/people/atrox/P3F-dabrowski-etal.pdf, 7 pages.
Denning, et al., "In Situ with Bystanders of Augmented Reality Glasses: Perspectives on Recording and Privacy-Mediating Technologies," ACM CHI, 2014, Apr. 26-May 1, 2014, Toronto, ON, Canada, 10 pages.
Geambasu et al., "Comet: An active distributed key-value store," University of Washington, USENIX OSDI, 2010, 14 pages.
Gray, Richard, "The places where Google Glass is banned," Dec. 4, 2013, <<http://www.telegraph.co.uk/technology/google/10494231/The-places-where-Google-Glass-is-banned.html>>, 15 pages.
Gruteser, et al., "Privacy-Aware Location Sensor Networks," In Proceedings of the 9th Workshop on Hot Topics in Operating Systems, May 18, 2003, Retrieved at https://www.usenix.org/legacy/events/hotos03/tech/full_papers/gruteser/gruteser.pdf, 6 pages.
Meta, Inc., "Space Glasses," Oct. 2013, Retrieved at https://www.spaceglasses.com/, 3 pages.
Needadebitcard, Please quit posting pictures of your debit cards, people, 2013, Retrieved at https://twitter.com/NeedADebitCard, 1 page.
Quest Visual, "WordLens: See the world in your language," retrieved at <<http://questvisual.com/>>, Jan. 23, 2014, 2 pages.
Wang, et al., "Computerized-Eyewear Based Face Recognition System for Improving Social Lives of Prosopagnosics," Proceedings of Conference on Pervasive Computing Technologies for Healthcare and Workshops, May 2013, Retrieved at http://www2.cs.uh.edu/~gnawali/papers/eyewearfacepervasivehealth2013.pdf, 4 pages.
Wendlandt et al., "Perspectives: Improving SSH-style Host Authentication with Multi-Path Probing," USENIX '08: 2008 USENIX Annual Technical Conference, Usenix Security Symposium, Jun. 2008, 15 pages.
Notice of Allowance, Examiner-Initiated Interview Summary and After Final Consideration Program Decision mailed Jan. 14, 2016 from U.S. Appl. No. 14/020,723, 20 pages.
Notice of Allowance mailed Jan. 14, 2016 from U.S. Appl. No. 14/020,708, 6 pages.
Response and After Final Consideration Pilot Program Request filed Feb. 26, 2016 from U.S. Appl. No. 14/020,735, 12 pages.
Advisory Action and AFCP 2.0 Decision mailed Mar. 4, 2016 from U.S. Appl. No. 14/020,735, 9 pages.
Response and Demand filed Mar. 13, 2015 to International Search Report and Written Opinion mailed Dec. 1, 2014 from PCT Patent Application No. PCT/US2014/053771, 17 pages.
Zimmerman, Phillip, "The Official PGP User's Guide," MIT Press, Cambridge, MA, USA, 1995.
Written Opinion of the International Preliminary Examining Authority mailed Aug. 14, 2015 from PCT Patent Application No. PCT/US2014/053771, 6 pages.
Non-Final Office Action mailed Jun. 9, 2015 from U.S. Appl. No. 14/020,708, 14 pages.
Response filed Sep. 3, 2015 to Non-Final Office Action mailed Jun. 9, 2015 from U.S. Appl. No. 14/020,708, 15 pages.
Non-Final Office Action mailed Aug. 12, 2015 from U.S. Appl. No. 14/020,723, 21 pages.
International Search Report and Written Opinion mailed Dec. 9, 2014 from PCT Patent Application No. PCT/US2014/053769, 13 pages.
Article 34 Demand and Response filed Mar. 23, 2015 to International Search Report and Written Opinion mailed Dec. 9, 2014 from PCT Patent Application No. PCT/US2014/053769, 24 pages.
Written Opinion of the International Preliminary Examining Authority mailed Jul. 22, 2015 from PCT Patent Application No. PCT/US2014/053769, 9 pages.
Search Report and Written Opinion mailed on Dec. 1, 2014 from PCT Patent Application No. PCT/US2014/053963, 12 pages.
Article 34 Demand and Response filed Mar. 13, 2015 from PCT Patent Application No. PCT/US2014/053963, 23 pages.
Written Opinion mailed on Aug. 13, 2015 from PCT Patent Application No. PCT/US2014/053963, 7 pages.
"Augmented Reality," Wikipedia, Retrieved on Nov. 27, 2014 from <<http://en.wikipedia.org/w/index.php?title=Augmented_reality&oldid=571607624>>, 19 pages.
Levy, Henry M., "Capability-Based Computer Systems," Dec. 31, 1984, Butterworth-Heinemann, Newton, MA, Sections 1.1, 8.1, 8.2, 230 pages.
Search Report and Written Opinion for PCT/US2014/053771 mailed on Dec. 1, 2014 14 pages.
Response filed Sep. 9, 2015 to Non-Final Office Action mailed Aug. 12, 2015 from U.S. Appl. No. 14/020,723, 13 pages.
International Preliminary Report on Patentability mailed Nov. 24, 2015 from PCT Patent Application No. PCT/US2014/053771, 14 pages.
Applicant-Initiated Interview Summary mailed Dec. 14, 2015 from U.S. Appl. No. 14/020,723, 4 pages.
Final Office Action mailed Dec. 18, 2015 from U.S. Appl. No. 14/020,735, 11 pages.
Notice of Allowance mailed Dec. 18, 2015 from U.S. Appl. No. 14/020,708, 13 pages.
Response filed Dec. 28, 2015 to the Final Office Action mailed Sep. 30, 2015 from U.S. Appl. No. 14/020,723, 13 pages.
Official Communication pursuant to Rule 161 mailed Apr. 13, 2016 from European Patent Application No. 14771666.6, 2 pages.
Response filed Jun. 3, 2016 to the Official Communication pursuant to Rule 161 mailed Apr. 13, 2016 from European Patent Application No. 14771666.6, 24 pages.
Supplemental Notice of Allowabilty mailed Jun. 10, 2016 from U.S. Appl. No. 14/020,735, 6 pages.
Corrected Notice of Allowabilty mailed Jun. 16, 2016 from U.S. Appl. No. 14/020,723, 6 pages.

(56) References Cited

OTHER PUBLICATIONS

Supplemental Notice of Allowability mailed Jun. 20, 2016 from U.S. Appl. No. 14/020,735, 6 pages.
Communication pursuant to Rules 161(1) and 162 EPC mailed Apr. 13, 2016 from European Patent Application No. 14771690.6, 2 pages.
Response filed May 25, 2016 to the Communication pursuant to Rules 161(1) and 162 EPC mailed Apr. 13, 2016 from European Patent Application No. 14771690.6, 25 pages.
Communication pursuant to Rules 161(1) and 162 EPC mailed Apr. 13, 2016 from European Patent Application No. 14771668.2, 2 pages.
Notice of Allowance mailed Mar. 17, 2016 from U.S. Appl. No. 14/020,708, 12 pages.
Corrected Notice of Allowability mailed Apr. 28, 2016 from U.S. Appl. No. 14/020,708, 6 pages.
Notice of Allowance mailed Apr. 12, 2016 from U.S. Appl. No. 14/020,735, 9 pages.
Notice of Allowance mailed Apr. 18, 2016 from U.S. Appl. No. 14/020,723, 14 pages.
Corrected Notice of Allowability mailed Apr. 28, 2016 from U.S. Appl. No. 14/020,723, 6 pages.
Response filed Oct. 13, 2016 to the official communication mailed Apr. 13, 2016 from European Patent Application No. 14771668.2, 18 pages.
Response filed Dec. 2, 2015 to the Non-Final Office Action mailed Sep. 23, 2015 to U.S. Appl. No. 14/020,735, 12 pages.
Molnar, et al., "Protecting Privacy in Web-Based Immersive Augmented Reality," U.S. Appl. No. 14/082,051, filed Nov. 14, 2013, 68 pages.
"Another way to attract women to conferences: photography policies," available at <<http://adainitiative.org/2013/07/another-way-to-attract-women-to-conferences-photography-policies/>>, The Ada Initiative, Jul. 4, 2013, 4 pages.
Avidan, et al., "Blind Vision," In Proceedings of the 9th European Conference on Computer Vision, 2006, 13 pages.
Hengartner, et al., "Protecting Access to People Location Information," In Security in Pervasive Computing, Lecture Notes in Computer Science, vol. 2802, 2004, 15 pages.
Borisov, et al., "Active Certificates: A Framework for Delegation," In Proceedings of the Network and Distributed System Security Symposium, 2002, 11 pages.
"CES 2011—Wearable HD 3D cameras by GOPRO," available at <<http://vimeo.com/18554202>>, butterscotch, access page for a video having a duration of 2.44 minutes, 2011, 2 pages.
Choe, et al., "Living in a Glass House: A Survey of Private Moments in the Home," In Proceedings of the 13th International Conference on Ubiquitous Computing, 2011, 4 pages.
Choe, et al., "Investigating Receptiveness to Sensing and Inference in the Home Using Sensor Proxies," In Proceedings of the 2012 ACM Conference on Ubiquitous Computing, 2012, 10 pages.
Clark, et al., "SoK: SSL and HTTPS: Revisiting past challenges and evaluating certificate trust model enhancements," In Proceedings of IEEE the Symposium on Security and Privacy, May 2013, 15 pages.
"Hands-on with Google Glass: Limited, fascinating, full of potential," available at <<http://reviews.cnet.com/google-glass/>>, Aug. 12, 2013, CNET.com, CBS Interactive Inc., with linked video presentation, CBS Interactive Inc., 25 pages.
"Qualcomm Fast Computer Vision SDK," available at <<http://www.cnx-software.com/2011/10/28/qualcomm-fast-computer-vision-sdk/>>, CNXSoft—Embedded Software Development, Oct. 2011, 5 pages.
"The Fitbit Story," available at <<http://www.fitbit.com/story>>, accessed on Jan. 20, 2014, Fitbit, Inc., San Francisco, CA, 11 pages.
Haldar, et al., "Semantic Remote Attestation—A Virtual Machine directed approach to Trusted Computing," In Proceedings of the Third Virtual Machine Research and Technology Symposium, 2004, 18 pages.

Hudson, et al., "Predicting Human Interruptibility with Sensors: A Wizard of Oz Feasibility Study," In Proceedings of SIGCHI Conference on Human Factors in Computing Systems, 2003, 8 pages.
Kharouni, Loucif, "The Dangers of Posting Credit Cards, IDs on Instagram and Twitter," available at <<http://blog.trendmicro.com/trendlabs-security-intelligence/the-dangers-of-posting-credit-cards-ids-on-instagram-and-twitter/>>, Security Intelligence Blog, Trend Micro Inc., Dec. 4, 2012, 4 pages.
Lasecki, et al., "Real-Time Crowd Labeling for Deployable Activity Recognition," In Proceedings of the 2013 Conference on Computer Supported Cooperative Work, Feb. 23, 2013, 10 pages.
Kotadia, Munir, "Jamming device aims at camera phones," available at <<http://news.cnet.com/2100-1009-5074852.html>>, CNET.com, CBS Interactive Inc., Sep. 3, 2003, 4 pages.
Lee, et al., "πBox: A Platform for Privacy-Preserving Apps," Proceedings of the 10th USENIX Symposium on Network Systems Design and Implementation, Apr. 2013, 15 pages.
Likamwa, et al., "Energy Characterization and Optimization of Image Sensing Toward Continuous Mobile Vision," Proceeding of the 11th Annual International Conference on Mobile Systems, Applications, and Services, Jun. 25, 2013, 13 pages.
Lioy, et al., "Trusted Computing," Handbook of Information and Communication Security, Stravroulakis, et al. (Eds.), 2010, 21 pages.
Massimi, et al., "Understanding Recording Technologies in Everyday Life," IEEE Pervasive Computing, vol. 9, Issue 3, Jul. 2010, 8 pages.
Tate, Ryan, "Google Glass Reborn as Something You'd Actually Want to Wear," available at http://www.wired.com/business/2013/08/meta_glass/>>, Wired, Aug. 19, 2013, 7 pages.
"Creating Your Own Code Access Permissions," available at <<http://msdn.microsoft.com/en-us/library/yctbsyf4(v=vs.90).aspx>>, Microsoft Developer Network, Microsoft Corporation, Redmond, WA, accessed on Jan. 20, 2013, 2 pages.
O'Brien, Kevin, "Swiss Court Orders Modifications to Google Street View," available at <<http://www.nytimes.com/2012/06/09/technology/09iht-google09.html?_r=0>>, New York Times, Jun. 8, 2012, 3 pages.
Paruchuri, et al., "Video Data Hiding for Managing Privacy Information in Surveillance Systems," EURASIP Journal on Information Security, Article No. 7, 2009, 18 pages.
Priyantha et al., "The Cricket Compass for Context-Aware Mobile Applications," In Proceedings of 7th Annual nternational Conference on Mobile Computing and Networking, 2001, 14 pages.
Sorrel, Charlie, "Word Lens: Augmented Reality App Translates Street Signs Instantly," available at <<http://www.wired.com/gadgetlab/2010/12/word-lens-augmented-reality-app-translates-street-signs-instantly/>>, Wired, Dec. 17, 2010, 4 pages.
"RunKeeper," available at <<http://en.wikipedia.org/wiki/RunKeeper>>, accessed on Jan. 20, 2014, Wikipedia online article, 2 pages.
"After Modifications, Google Street View Approved for Switzerland," available at <<http://yro.slashdot.org/story/12/06/09/1645213/after-modifications-google-street-view-approved-for-switzerland>>, Soulskill, Slashdot, Jun. 9, 2012, 14 pages.
Tennenhouse, et al., "A Survey of Active Network Research," In IEEE Communications Magazine, vol. 35, Issue 1, 1997, 7 pages.
"Google Glasses Banned," available at <<http://the5pointcafe.com/google-glasses-banned/>>, The 5 Point Café, Mar. 11, 2013, 4 pages.
Simonite, Tom, "Bringing Cell-Phone Location-Sensing Indoors," available at <<http://www.geoconnexion.com/articles/bringing-cell-phone-location-sensing-indoors/>>, accessed on Jan. 20, 2013, GeoConnexion, 3 pages.
Whitney, Lance, "Google Glass Code Lets You Snap a Photo with a Wink," available at http://news.cnet.com/8301-1023_3-57582500-93/google-glass-code-lets-you-snap-a-photo-with-a-wink/, May 2, 2013, CNET.com, CBS Interactive Inc., 21 pages.
Beresford, Alastair R., "Location Privacy in Ubiquitous Computing," available at <<http://www.cl.cam.ac.uk/research/dtg/www/publications/public/arb33/UCAM-CL-TR-612.pdf>>, Technical

(56) References Cited

OTHER PUBLICATIONS

Report 612, 2005, University of Cambridge Computer Laboratory, Cambridge, UK, 139 pages.
Liao, Tony, "A Framework for Debating Augmented Futures: Classifying the Visions, Promises and Ideographs Advanced About Augmented Reality," Proceedings of the IEEE International Symposium on Mixed and Augmented Reality, Nov. 5, 2012, 10 pages.
Gruteser, et al., "Privacy-Aware Location Sensor Networks," Proceedings of the 9th Workshop on Hot Topics in Operating Systems, 2003, 6 pages.
Ferreira, et al., "Security and Privacy in a Middleware for Large Scale Mobile and Pervasive Augmented Reality," In Proceedings of International Conference on Software, Telecommunications and Computer Networks, 2007, 5 pages.
Wang, et al., "Computerized-Eyewear Based Face Recognition System for Improving Social Lives of Prosopagnosics," In Proceedings of the Conference on Pervasive Computing Technologies for Healthcare and Workshops, Mar. 2013, 4 pages.
Dabrowski, et al., "Framework based on Privacy Policy Hiding for Preventing Unauthorized Face Image Processing," Nov. 20, 2013, 7 pages.
Kohno, et al., "World-Driven Access Control," U.S. Appl. No. 14/020,735, filed Sep. 6, 2013, 63 pages.
Notice of Allowance mailed Sep. 16, 2015 from U.S. Appl. No. 14/020,708, 7 pages.
Corrected Notice of Allowability mailed Sep. 25, 2015 from U.S. Appl. No. 14/020,708, 2 pages.
Non-Final Office Action mailed Sep. 23, 2015 to U.S. Appl. No. 14/020,735, 16 pages.
Final Office Action mailed Sep. 30, 2015 from U.S. Appl. No. 14/020,723, 17 pages.
International Preliminary Report on Patentability mailed Nov. 5, 2015 from PCT Patent Application No. PCT/US2014/053769, 22 pages
International Preliminary Report on Patentability mailed Nov. 20, 2015 from PCT Patent Application No. PCT/US2014/053963, 18 pages.

\* cited by examiner

WORLD-DRIVEN ACCESS CONTROL USING TRUSTED CERTIFICATES

This application is a continuation-in-part of U.S. application Ser. No. 14/020,735 (the '735 application), filed on Sep. 6, 2013, entitled "World-Driven Access Control." The '735 application is incorporated by reference herein in its entirety.

BACKGROUND

An augmented reality application provides an output presentation which combines information captured from the environment with supplemental information. For example, one type of augmented reality application presents an image of the environment, together with labels that annotate objects within the image. Another type of augmented reality application provides an animated character which duplicates the movement of a human user, together with a virtual object with which the user may interact.

Any application that captures information from the surrounding environment raises privacy concerns. For example, the above-described augmented reality applications capture images or videos of the environment; that information, in turn, can potentially include sensitive items, such as human faces, personal writing, account numbers, etc. The "owner" of this private information will often prefer or insist that the information is not released to others. The owner of this private information may correspond to the person using the augmented reality application or someone else, such as a bystander, who is impacted by this technology. The above-described privacy concerns are not unique to augmented reality applications, but extend to any application which captures perceptual information from the environment. Such applications are referred to herein as environment-sensing applications.

In practice, an application developer may create an environment-sensing application as a "one-off" self-contained unit of code. In doing so, each developer may address the above-described privacy concerns in a separate—typically ad hoc—manner, within the application code itself, if this problem is addressed at all.

SUMMARY

A management module is described herein for receiving events which characterize features in an environment, and for identifying at least one policy based on the events. The management module ensures that the policy is valid by consulting a certificate associated with the policy. If valid, the management module uses the policy to govern the behavior of at least one application. For example, the management module can control the type and form of events that are forwarded to an application.

According to another illustrative aspect, a trusted passport authority (PA) entity is employed to generate certificates. Each certificate that is granted pertains to a policy which confers rights to one or more applications with respect to a particular target feature in the environment, such as a person, inanimate object, physical region, etc. The PA entity issues a certificate that applies to a target feature when it successfully verifies that an entity which requests the certificate is authorized to set a policy for that target feature. That entity, if authorized, may be regarded as the "owner" or controlling agent of the target feature.

According to another illustrative aspect, each certificate may provide: (1) a signature which indicates that it originates from the trusted PA entity; (2) context information which describes a context in which the policy is intended to be applied within an environment; and/or (3) machine-readable content for use by the management module in carrying out at least one aspect of the policy. In some cases, the machine-readable content may correspond to executable instructions (e.g., code) that the management module may load, allowing the management module to henceforth recognize objects associated with the policy.

According to another illustrative aspect, monitoring functionality may be employed to determine whether an anomaly has occurred in the application of a policy. For example, the monitoring functionality may determine whether a triggering cue, which invokes a policy, remains present in an environment, in those circumstances in which its presence is expected. If this test is not met, the monitoring functionality can take one or more kinds of threat-ameliorating actions.

Overall, the above-summarized functionality provides a readily-adaptable and application-agnostic way to control the manner in which environment-sensing applications interact with their environments. The functionality's use of certificates and the monitoring functionality reduces the ability of individuals to maliciously or inadvertently introduce fraudulent policies into the environment and/or to remove valid polices from the environment.

The above approach can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative environment-sensing framework in which applications are controlled by policies associated with features in a sensed environment, and where a trusted passport authority (PA) entity vouches for the authenticity of those policies. Section B sets forth illustrative methods which explain the operation of the functionality of Section A. Section C describes illustrative computing functionality that can be used to implement any aspect of the features described in Sections A and B.

Figure 19:
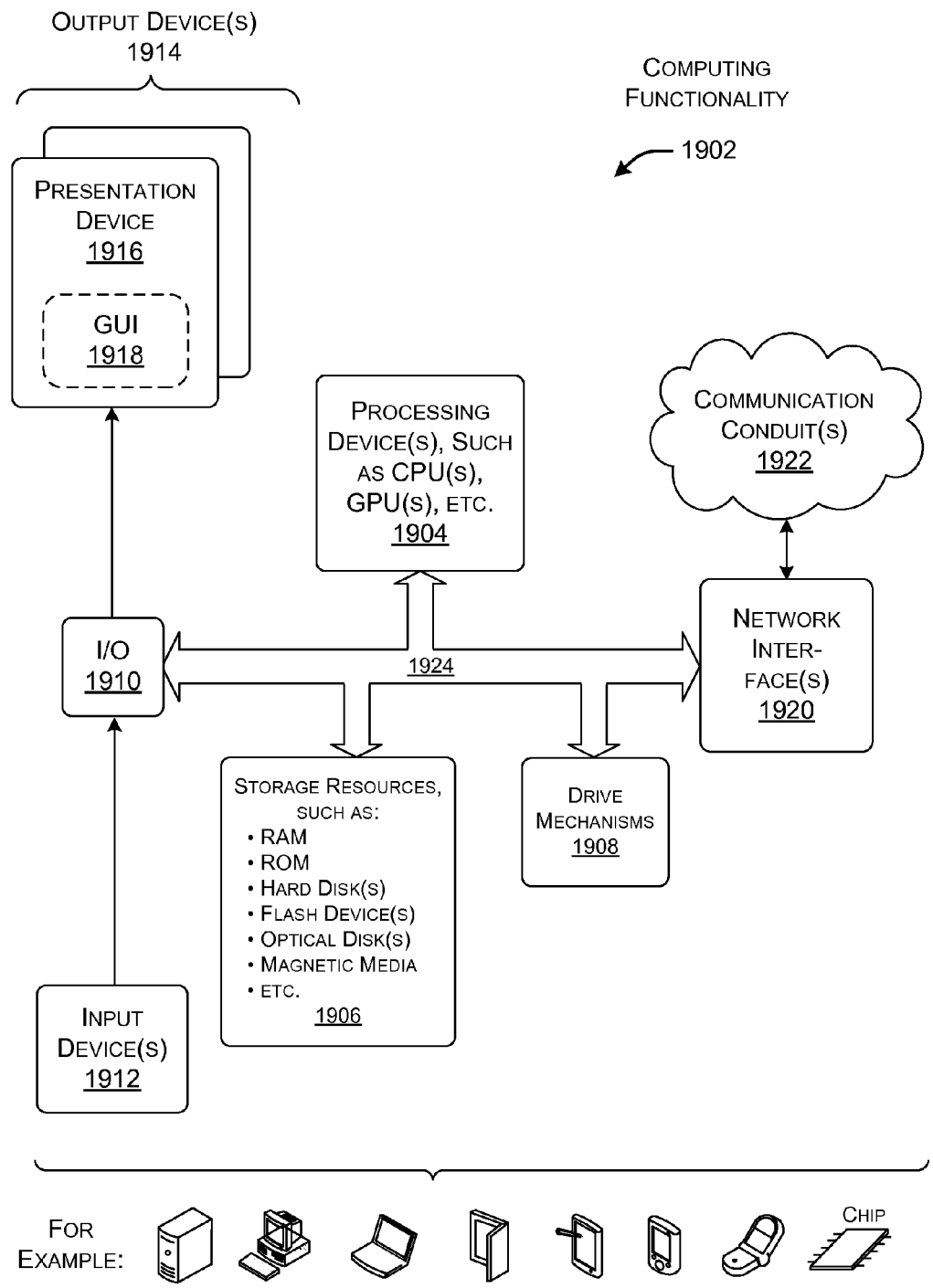
FIG. 19 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 19, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Environment-Sensing Framework

A.1. Overview of the Framework

Figure 1:
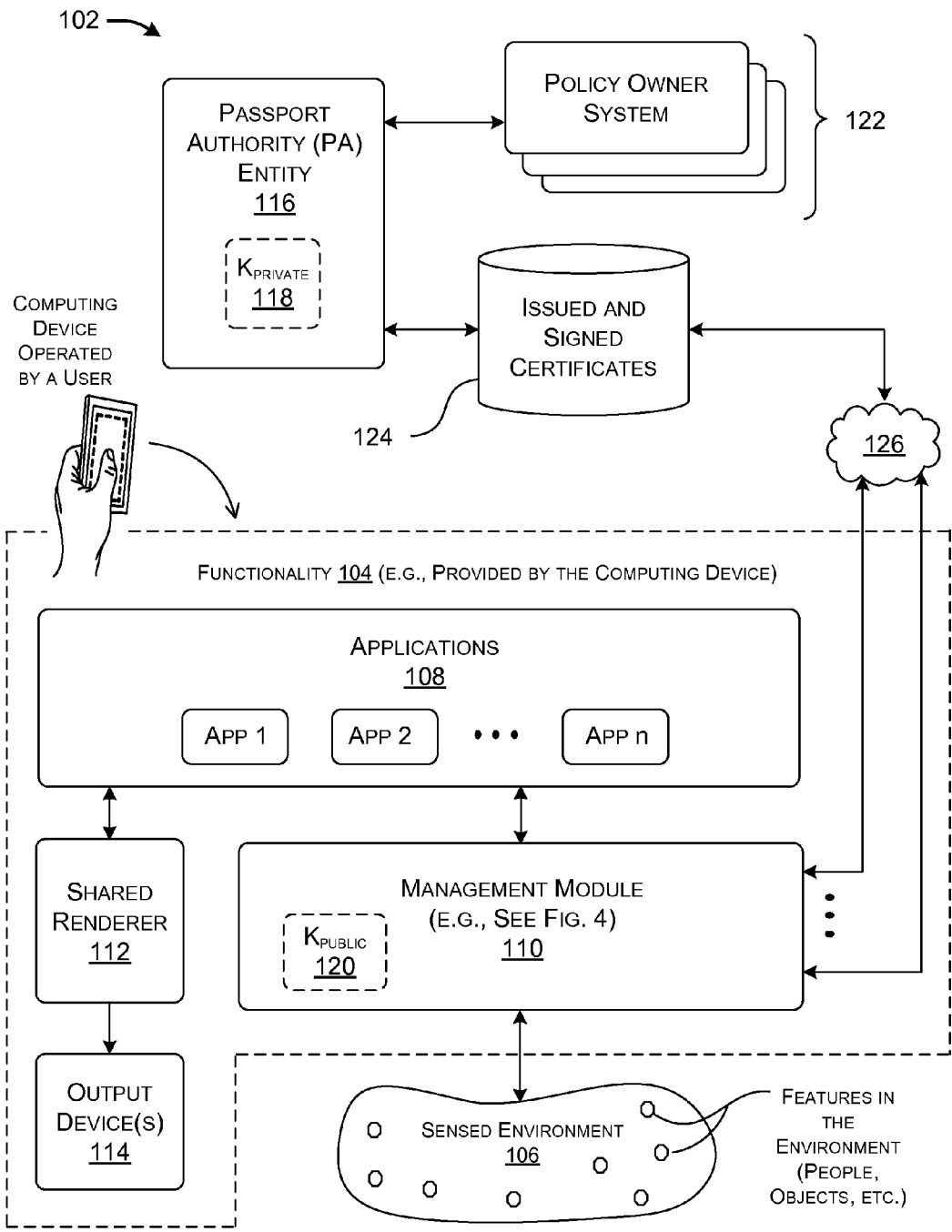
FIG. 1 shows an illustrative framework for managing the manner in which applications consume information pertaining to an environment.

FIG. 1 shows an environment-sensing framework 102 ("framework") that includes functionality 104 associated with a single computing device, or two or more computing devices. (To simplify explanation, the computing device will be referred to in the singular below.) The computing device and its functionality 104 operate within an environment 106, under the direction of a user or other controlling entity. More specifically, the framework 102 hosts multiple such instances of the functionality 104, each associated with at least one computing device that operates in a respective environment, and under the control of a respective user or other entity. FIG. 1 shows only a single representative instance of the functionality 104 and its environment 106 to simplify explanation.

The computing device may correspond to any type of device which performs computing functions, such as a traditionally stationary personal computing device, a laptop computing device, a set-top box device, a game console device, a smartphone or other mobile telephone device, a portable digital assistant device, a tablet-type or stylus-type computing device, a media-playing device, an electronic book reader device, a portable game-playing device, a wearable computing device, and so on.

The functionality 104 may be considered to be associated with the computing device in different senses, corresponding to different respective implementations. In a first case, the functionality 104 is associated with a computing device because it is enclosed by the housing of the computing device or otherwise part of the device itself. Alternatively, or in addition, the functionality 104 is associated with the computing device because it is locally coupled to the computing device. Alternatively, or in addition, the functionality 104 is associated with the computing device because it is accessible to the computing device, but not necessarily locally associated with the computing device.

The functionality 104 hosts a collection of one or more augmented reality applications 108 and/or any other environment-sensing applications. In general, the applications 108 perform respective functions which involve receiving and consuming information that has been extracted from the environment 106. Indeed, some of the applications 108 may operate by continuously sensing and processing information extracted from the environment 106. From the standpoint of these kinds of applications 108, the sensing mechanisms (not shown) which sense the environment 106 continuously operate in their active ("ON") states.

The functionality 104 may obtain the applications 108 from any source(s) in any manner. In one case, a user can explicitly download or otherwise obtain an environment-sensing application from any source, such as an online marketplace of such applications. In another case, a user may more passively select an application, such as by visiting an online website which invokes the application. An application generally corresponds to a body of computer-implemented instructions, expressed in any computing language or combination of computing languages.

The operation of the functionality 104 may involve two main flows of information. In the first main flow, a policy-based management module 110 (henceforth, simply "management module") receives information from the environment 106. More specifically, the environment 106 may be said to include a number of features, corresponding to different objects, locations, occurrences, etc. within the environment 106. In one implementation, the management module 110 uses a recognition system (to be described below) that generates events. Each event characterizes one or more sensed features in the environment 106. For example, one event may identify the presence of a person in the environment 106. Another event may identify an action taken by the person. Another event may describe the face of that person. Another event may identify the presence of a beacon generated by a radio source, and so on. The management module 110 may also receive supplemental information that pertains to the environment 106, from one or more additional sources (such as publically available and/or private databases, etc.).

Based on the collected events, the management module 110 identifies zero, one or more policies. Each policy governs the behavior of one or more of the applications 108. For example, some policies may control the information that the applications 108 are allowed to extract from the environment 106. For instance, these policies may specify the events that may be sent to one or more applications. In addition, some of these policies may also specify processing to be performed on the events before they are sent to the applications.

For example, a first illustrative policy of the above-described type may specify that one or more applications are not permitted to receive any video information that is captured in the bathroom of a health club. A second policy may specify that one or more applications are not permitted to receive any audio information after the phrase "No Recording" has been detected by a voice recognizer; that no-recording status remains in effect until the voice recognizer detects a "Start Recording" audio message. A third policy may specify that one or more applications are permitted to receive video information from the environment 106, but only after faces that appear in the video information have been suitably obscured. A fourth policy may perform the same face-obscuring function as the third policy, but only for people that are strangers with respect to the user who is performing the recording; the management module 110 can distinguish strangers from people who are known to the user using a face recognizer.

In addition, or alternatively, some policies may govern the information that one application is allowed to share with another application, or another entity. In addition, or alternatively, some policies may govern the information that an application is allowed to send to output devices. In addition, or alternatively, some policies may govern code that an application is allowed to execute, and so on.

In a second main flow, the applications 108 provide output information to a shared renderer 112. The shared renderer 112 updates shared state information based on the output information. The shared renderer 112 then generates an output presentation based on the shared state information, which it provides to one or more output devices 114, such as a display mechanism of the computing device.

The management module 110 and the shared renderer 112 of the functionality 104 may represent trusted functionality provided by the computing device. For example, a trusted operating system of the computing device may implement the shared renderer 112 and the management module 110. The applications 108, by contrast, may correspond to untrusted modules.

Later sections of this disclosure describe the operation of the management module 110 in greater detail. By way of overview here, the management module 110 may govern the behavior of the applications 108 based on policy information associated with one or more policies. An instance of policy information may include multiple components of information. One component corresponds to permission-granting information, which describes constraints imposed by a corresponding policy, such as by specifying that the policy prohibits all applications (or some applications) from recording the environment 106 when the user is operating the computing device in a bathroom.

In one approach, the management module 110 may receive policy information, corresponding to a particular policy in response to detecting a triggering cue in the environment 106. Some triggering cues correspond to features in the environment 106 which expressly identify policies. For example, express triggering cues may include, but are not limited to: visually-recognizable codes of any type, such as bar codes, Quick Response (QR) codes, color codes, etc.; alphanumeric labels, such as a caption that reads "No Recording!" or the like; telltale gestures or the like, such as when a user makes a halt gesture with the palm of his or her hand; spoken messages, as when a user speaks the phrase "Stop Recording"; signals that carry codes or messages, such as radio beacons, ultrasound signals, and so on.

Alternatively, or in addition, the triggering cues implicitly identify policies based on natural objects and/or occurrences in the environment. For example, the management module 110 may select a restricted mode of recording upon detecting any of the following implicit cues: a closed door; a toilet-like object or a flushing-type sound; whispering among communication participants; time of day; day of week; location, and so on.

Or the management module 110 can use a confluence of any explicit and/or implicit evidence items to determine the characteristics of the environment 106, e.g., by determining that the user is present in a bathroom environment if any x evidence items in a set of N possible evidence items indicate that the user is present in that environment.

Once a policy is triggered, the management module 110 can obtain the policy information associated with the invoked policy from different sources. For instance, in one case, the management module 110 may obtain at least some of the policy information from the environment 106 itself. For instance, the management module 110 can extract policy information from a radio beacon within a bathroom; in other words, that signal may both invoke a policy and describe the features of that policy.

Alternatively, or in addition, the management module 110 can obtain at least some policy information from a local and/or remote source, meaning a source that is local or remote with respect to the location of the computing device. For example, consider the illustrative case in which the cue that triggers a policy corresponds to a QR code. That QR code may convey a link which points to a local source, such as a file stored in a local data store which provides information regarding the policy. Alternatively, or in addition, the link may correspond to a Uniform Resource Locator (URL) or the like which points to a remote site, such as a remote data store which provides information regarding the policy. Upon obtaining information from a remote source, the management module 110 can optionally store it in a local store so that it is henceforth more readily available to the management module 110 upon subsequent invocations of the policy. If the management module 110 cannot access the remote source immediately, it may buffer a lookup request and try again later.

In addition, or alternatively, the management module 110 can receive policy information in advance of the invocation of any policy. For example, in a preliminary configuration operation, the management module 110 may receive and store a file which provides policy information for a set of policies that may be subsequently invoked, when the computing device encounters triggering cues associated with those policies. The above-described scenarios are illustrative, rather than exhaustive; the management module 110 can obtain information regarding a policy from yet other sources.

To explain further aspects of the framework 102, first consider the illustrative nature of a particular policy, associated with an instance of identified policy information. The objective of the policy is to confer some right to one or more applications with respect to an identified target feature in the environment. For example, the target feature may correspond to a person, inanimate object, geographical region, building, room, etc.

In many cases, a person, group of people, or other kind of entity enjoys the privilege of setting a policy for an identified target feature. That entity is referred to herein as the authorized entity, or less formally, as the "owner" or controlling agent of the policy. For example, consider the case in which the target feature corresponds to an object owned by a person, e.g., selected from inanimate objects (cars, houses, etc.) and features of the person himself or herself (his/her face, voice, etc.). That person may correspond to the authorized entity that is entitled to set a policy for the object. In other cases, the authorized entity may correspond to a group of people that "owns" the target feature. For example, a township may set a policy regarding recording that takes place in its parks or other public areas. In other cases, an authorized entity may correspond to an agent that sets a policy on behalf of others. For example, a parent may set a policy on behalf of his or her child, an employer may set a policy for its employees, and so on.

In one implementation of the framework 102, any policy may be binding on the end user who operates the computing device, or non-binding. In the latter case, the user may override the policy for any reason. The framework 102, however, may place more constraints on the ability of a user to override a policy that is authored or sponsored by a bystander, rather than the user himself or herself.

The management module 110 may encounter a number of challenges in administering policies authored and "owned" by different entities. In a first challenge, two or more entities may set policies regarding the same target feature, based on valid claims of ownership. For example, both an employer and an employee may set a policy which pertains to the ability of applications to record the face of the employee. Those policies may conflict, in that the employee may prohibit recording, but the employer may allow it, or vice versa. Subsection A.5 describes techniques for addressing this challenge. In brief, the management module 110 can apply various rules to rank conflicting policies, and then select a top-ranking policy. In addition, or alternatively, the management module 110 can solicit instructions from the user of the computing device (or some other entity) before deciding what policy to apply to a target feature.

In another case, an entity may set a policy that affects a target feature even though that entity is not the authorized entity for that feature. The entity may perform this act in a malicious or inadvertent manner. For example, consider the illustrative case in which a policy is triggered by the detection of a QR code. A malicious actor may create a fraudulent QR code and paste it over a valid QR code at a particular location, such as the wall in a particular room in a particular building. Or the malicious actor may remove a QR code from a first location and place it in a second location, making that once legitimate QR code a now-fraudulent QR code. In either case, the fraudulent QR code may cause a computing device which reads it to perform potentially undesirable actions, such as recording the environment 106 when recording is not permitted, or failing to record the environment 106 when recording is desired. Even more vexing, the QR code may allow a malicious application, working in tandem with the fraudulent QR code, to send private information to a malicious site, such as by sending video-captured credit card numbers to the malicious site. According to another strategy, the malicious entity may simply remove the existing QR code at a particular location, which has the effect of removing any recording-related rules associated with the QR code at that location.

In more innocent circumstance, an employee may mistakenly place an incorrect QR code in a meeting room, or mistakenly remove an existing QR code. That employee may believe that he or she has authorization to perform this act, but, in fact, the employee lacks such authorization.

Entities can tamper with other types of cues in a similar manner. For example, a malicious entity may attempt to block (e.g., jam) a radio beacon, and/or introduce a fraudulent radio beacon, etc.

The framework 102 includes various mechanisms to address the above-described types of threats pertaining to the authenticity of policies. According to a first mechanism, the framework 102 provides a passport authority (PA) entity 116. The PA entity 116 issues digital certificates for respective policies. Each certificate, for a corresponding policy that applies to a target feature, serves as proof that the policy was created by the owner of the target feature. Further, the PA entity 116 may sign the certificate using its private key 118. Recipients of the certificate can use a corresponding public key (e.g., a public key 120 used by the management module 110) to decrypt the certificate, and if successful in the decryption, to thereby verify that it originated from the PA entity 116, and not some other entity.

A certificate may provide various items of information pertaining to its corresponding policy. For example, a certificate can provide context information which describes a context in which the policy is intended to be applied within an environment. For instance, the context information may indicate that the policy only applies when the computing device is within proximity to a radio beacon, e.g., indicating that the computing device is within a particular building or room. The management module 110 can use the context information to determine whether the policy properly applies to an actual context that has encountered. For example, a QR code may trigger a particular policy at a particular location, but the context information may indicate that the policy is not intended to apply to that location. In response, the management module 110 may choose to ignore the policy, or take some other implementation-specific action.

In addition, or alternatively, the certificate may provide machine-readable content, such as executable instructions, configuration settings, metadata, etc. The management module 110 can use the machine-readable content to configure itself, enabling it to carry out some aspect of the policy under consideration. For example, the machine-readable content may correspond to executable code. The management module 110 can use the executable code to recognize a particular cue in the environment 106 that, when encountered, will trigger the policy under consideration.

In addition, a certificate may provide permission-granting information, which describes permissions conferred by the policy to one or more applications. A certificate may include yet other information items.

More generally, in one case, a digital certificate encapsulates and communicates all policy information associated with a policy, including the above-described permission-granting information. In another case, the digital certificate may also vouch for the authenticity of other aspects of the policy information, which are not conveyed by the digital certificate per se. For example, the policy information may correspond to permission-granting information together with a separate certificate; the certificate vouches for the authenticity of the permission-granting information. However, to simplify explanation, it will henceforth be assumed that the digital certificate contains all information pertaining to a policy.

In some implementations, however, not all policies have corresponding certificates. In some cases, for example, there is a low risk that a malicious entity can hijack a policy. In other cases, there is a risk that a malicious entity may misappropriate a policy, but the potential damage caused by such misuse is not great. Owners of target features may optionally choose to omit certificates for the target features in the above-described illustrative circumstances. The policy information associated with a policy that has no certificate may correspond to an instance of unsigned permission-granting information, and/or other information.

The management module 110 can handle the absence of a certificate in different case-specific and implementation-specific ways. For example, the management module 110 can assess the risk of a missing certificate (based on multiple factors), and then take various threat-ameliorating actions if deemed appropriate. For example, the management module 110 can decline to apply a policy lacking a certificate in certain circumstances; in other circumstances, it may apply it, but with a warning message to the user.

Any type of equipment can be used to implement the PA entity 116. For example, in one case, the PA entity 116 may be implemented using one or more server computing devices, associated data stores, etc. A party—referred to as a requesting entity herein—may interact with the PA entity 116 for the purpose of creating a certificate for a target feature that it purports to own. The requesting entity can use various devices and via various communication channels to perform this interaction. For example, the PA entity 116 may provide a secure web site with which the requesting entity may interact, using any type of computing device.

In operation, the requesting entity may submit whatever proof is requested by the PA entity 116 to satisfy the PA entity 116 that the requesting entity is, in fact, the owner of the target feature in question. The proof in each case depends on the nature of the target feature, and the implementation-specific demands of the PA entity 116. To cite an illustrative example, suppose that a person wishes to set a policy that will prevent others from recording the interior of his or her home. That person may prove that he or she is entitled to set this policy by proving that he or she owns the home in question, or at least resides there. In another case, suppose that a person wishes to set a policy that will prevent others from recording his or her face. The person may prove that she "owns" his or her face by submitting appropriate documentation, such as a driver's license, passport, etc.

In the illustrative context of FIG. 1, one or more policy owners may operate computer systems 122 to interact with the PA entity 116. The PA entity 116 may then store issued certificates in one or more data stores 124. In one case, for example, the PA entity 116 may administer the data stores 124 as part of a network-accessible site. Alternatively, or in addition, each owner may provide a data store which stores certificates for its target features.

The above description has already set forth various ways in which the management module 110 may obtain policy information. Insofar as a certificate may correspond to the vehicle for providing some or all of the policy information for a corresponding policy, the management module 110 may use any technique described above for obtaining a certificate. For instance, the management module 110 can obtain the policy information by retrieving a certificate from a remote source (such as the data stores 124) and/or a local source. Further, the management module 110 may obtain the certificate at the time that the policy is invoked, and/or in advance of invoking the policy. If the certificate is obtained from a remote source, the management module 110 may cache the certificate in a local store, so that it is more readily available upon again encountering the associated policy. The management module 110 can also manage its locally stored certificates in any manner. For example, each certificate may include time information which indicates a span of time for which it is valid. The management module 110 can perform periodic and/or episodic maintenance to delete certificates which have expired, and obtain updated versions of these certificates.

In some implementations, the policy information for a policy may include some items of information that are not conveyed by the certificate itself. In those cases, the management module 110 can obtain the different pieces of the policy information from a single source or from different respective sources. The management module 110 can further use a single protocol for collecting different pieces of policy information or different respective protocols.

A computer network 126 may allow the various entities within the framework 102 to communicate with each other. The computer network 126 may correspond to a local area network, a wide area network (e.g., the Internet), point-to-point links, etc., or any combination thereof. For instance, the owners may use the computer network 126 to interact with the PA entity 116. The management module 110 may also use the computer network 126 to receive certificates from the data stores 124, and so on.

Although not shown in FIG. 1, the framework 102 can also provide monitoring functionality. That monitoring functionality may detect anomalies in the execution of policies. In one such case, the monitoring functionality can infer that a triggering cue associated with a policy has been maliciously or inadvertently removed from an environment. The monitoring functionality can then take one or more threat-ameliorating actions, to be described below.

In summary, the framework 102 allows a computing device to control the manner in which applications consume information from the environment 106 based primarily on cues within the environment, which invoke corresponding policies. Users and other entities which "own" or otherwise control target features define the policies for those features in a user-driven distributed fashion. The trusted PA entity 116 verifies that the entities which set the policies are entitled to do so, and provides other information that can be used to determine whether it is appropriate to apply the policies in particular situations. The framework 102 applies all of these services in an application-agnostic manner, e.g., by leveraging the trusted management modules of computing devices, which may be implemented by the respective operating systems of the computing devices.

The framework 102 may provide a number of advantages. A non-exhaustive and illustrative list of possible benefits follows.

First, the framework 102 has wide application to many different applications, principally because it is application-agnostic in nature. In other words, the applications receive the services of the framework 102, rather than implement those services within their application code in an ad hoc and application-specific manner.

Second, the framework 102 reduces the burden on application developers in addressing privacy concerns, again because the framework 102 handles security using the management module 110, rather than entrusting those operations to the applications. At the same time, the framework 102 does not preclude the use of application-centric security solutions (such as manifests and prompts), which may operate as supplemental services to those provided by the framework 102.

Third, the framework 102 offers a uniform privacy-related experience to users of environment-sensing technology, as well as those bystanders impacted by its use. This advantage promotes familiarity with this technology, which, in turn, may promote acceptance of this technology. While the general experience is uniform, the framework 102 also empowers individual users to set policies in a fine-grained and potentially idiosyncratic manner, e.g., by attaching user-defined policies to specific features in an environment. In other words, the users who are most affected by environment-sensing technology are the primary agents which ultimately define the policies with respect to "things" in the world.

Fourth, the framework 102 reduces the burden on end users during the use of environment-sensing technology, e.g., by eliminating or reducing user interaction (e.g., through the use of prompts, etc.).

Fifth, the framework 102 provides a host of safeguards regarding its application of policies. One such safeguard corresponds to its use of the trusted management module 110 to administer policies. Another safeguard corresponds to its use of certificates and the monitoring functionality to help ensure that policies are valid and correctly applied. Such safeguards may further promote public acceptance of environment-sensing technology.

A.2. Example Scenario

Figure 2:
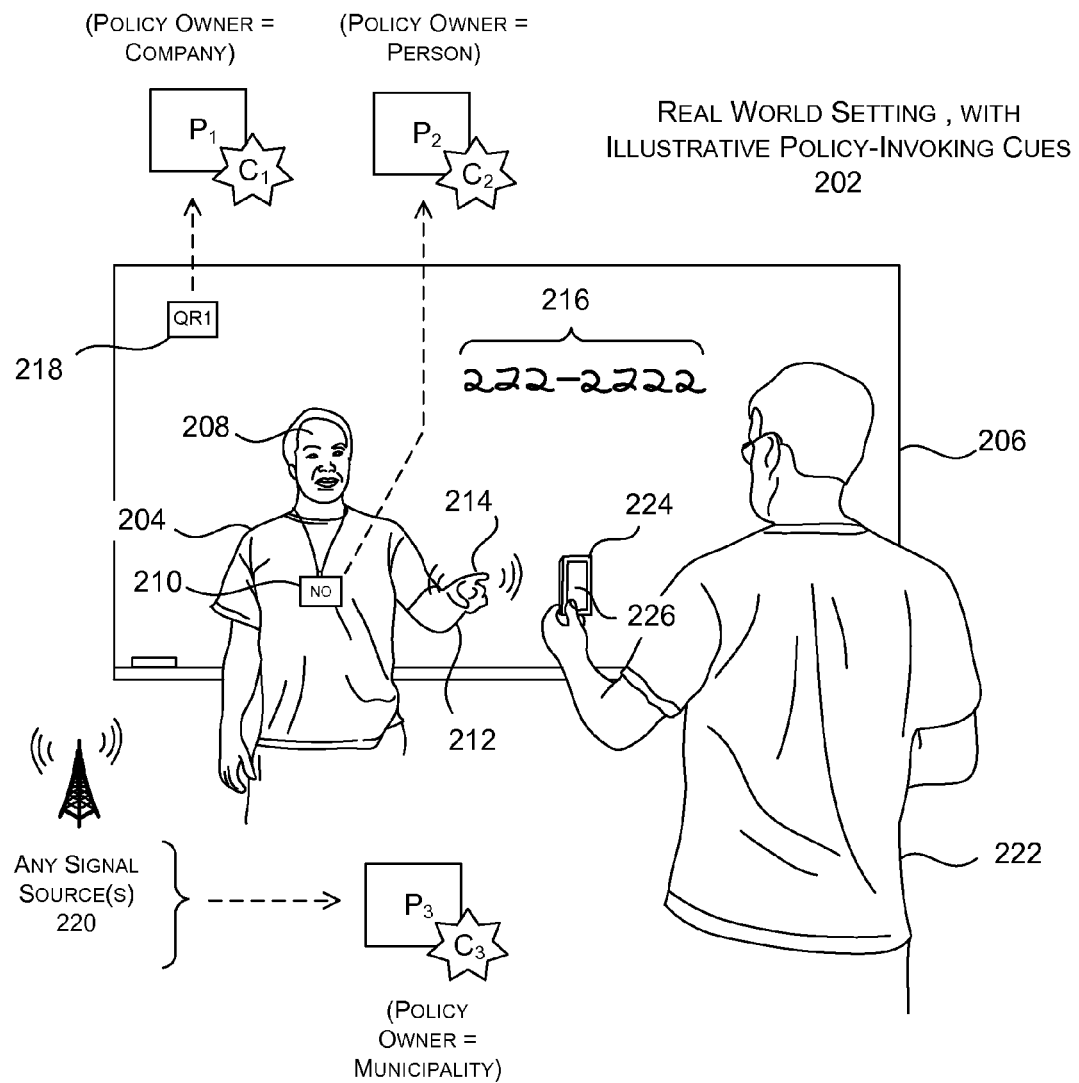
FIG. 2 shows an illustrative scenario to which the framework of FIG. 1 may be applied.

FIG. 2 shows a scenario in which the framework 102 may be applied to control the manner in which environment-sensing applications interact with a sensed environment. In this merely illustrative case, assume that at least some of the environment-sensing applications seek to capture video information from the environment and process that video information for various reasons. For example, an augmented reality application of this type may seek to capture video information from the environment and subsequently add descriptive labels to recognized objects in the environment. That augmented reality application may produce an output presentation that combines video information captured from the scene with its added labels.

As shown in FIG. 2, a real world setting 202 includes a first person 204 who is standing in front of a whiteboard 206. Among other characteristics, the first person 204 possesses a face 208, and wears a label-bearing badge 210. Further, the first person 204 adopts a pose in which his arm 212 is outstretched. Various actions may also occur in the real world setting 202. For example, the first person 204 is making a gesture 214 with his outstretched hand, shaking it back and forth as if to signal disapproval. The whiteboard 206 includes writing 216 and a code-bearing label 218.

The real world setting 202 also includes one more signal sources 220, such as any source of electromagnetic signals (radio signals, microwave signals, infrared signals, magnetism signals, etc.), acoustic signals (e.g., ultrasound signals, etc.), and so on. Some of the signal sources 220 may be local with respect to the immediately sensed environment, such as Wi-Fi access point sources. Other signal sources 220 may be remote, such as radio towers, satellite sources, and so on. The environment-sensing framework 102 can use any technology to process the signals from the sources 220, such as Bluetooth® technology, dead reckoning techniques, triangulation techniques, global position detection techniques, sound detection techniques, and so on.

A second person 222 captures the above-described scene using a computing device 224, such as a smartphone, a tablet computing device, etc. The computing device 224 implements at least part of the functionality 104 shown in FIG. 1. More specifically, the second person 222 orients the computing device 224 such that its video camera (not shown) captures a video representation of at least the first person 204 and the whiteboard 206. The computing device 224 can also include one or more other environment sensing mechanisms, such as, but not limited to, one or more microphones, one or more motion sensing devices (such as one or more accelerometers, one or more gyroscopes, etc.), and so on. These other sensing mechanisms may capture other aspects of the real world setting 202.

The computing device 224 may also include one or more output devices, such as a display mechanism 226. The display mechanism 226 provides an output presentation produced by the environment-sensing application(s) that are running at a current time. In the scenario shown in FIG. 1, the display mechanism 226 acts as a "window" to the real world setting 202, from the vantage point of the second person 222. In other words, the content presented on the display mechanism 226 mirrors the actual world in front of the computing device 224, as if the user was looking through a window onto the world.

In the case of FIG. 2, the second person 222 points the computing device 224 such that the field of view of the video camera is directed away from the second person 222. But other arrangements may be used to deliver an augmented reality experience. In another case, for instance, the second person 222 may operate within a field of view associated with plural video cameras, which capture the second person 222 from different vantage points. The second person 222 may consume the output presentation produced by the environment-sensing applications on any output device, such as a display monitor (not shown) that is placed generally in front of the second person 222.

In another case, the second person 222 may interact with the environment-sensing applications via any type of wearable computing device. For example, such a computing device may be affixed to eyewear, apparel, a watch, jewelry, a badge, or other wearable item. Any type of sensing mechanisms and output devices may be affixed or otherwise associated with the wearable item. For example, a video camera affixed to eyewear can capture a video representation of the scene in front of the second person 222, while a display mechanism affixed to the eyewear may deliver the output presentation provided by the environment-sensing applications. The above-described form factors are cited by way of example, not limitation; still other arrangements are possible.

Overall, the environment shown in FIG. 2 includes a number of triggering cues. Each such triggering cue invokes a particular policy. Each policy, in turn, is associated with a particular target feature in the environment, which is "owned" by an authorized entity.

For example, the code-bearing label 218 may be associated with a first policy $P_1$. That policy may constraint the manner in which the applications capture video information of the whiteboard 206. The target feature that corresponds to this triggering cue is the whiteboard 206. Assume that the whiteboard appears within a room of a company, and that the company is therefore the authorized entity for this target feature.

The badge 210 is associated with a second policy $P_2$. That policy may constrain the manner in which the applications capture video information of the first person 204, or just the first person's face 208. The target feature in this case corresponds to the first person 204 as a whole, or his face 208. The authorized entity in this case likely corresponds to the first person 204. Although not shown, the shaking gesture 214 made by the first person 204 may be associated with another policy that is "owned" by the first person 204.

The signal sources 220, which may correspond to radio beacons (for instance), are associated with a third policy $P_3$. That policy may constrain the manner in which the applications capture video information in general, while operating within a particular area of a city. The target feature in this case corresponds to the particular region of the city. The authorized entity in this case corresponds to the city, which may act through a duly authorized representative. In another case, the signal sources 220 may correspond to an acoustic emitter, such as an ultrasound source. The policy $P_3$ associated with this source may apply to wherever the computing device's acoustic detector (e.g., a microphone) can "hear" the signal emitted by this source, which may correspond to a particular part of a building, for instance, such as an individual room.

As can be appreciated, the real world setting 202 of FIG. 2 may contain any additional types of triggering cues associated with respective policies.

Figure 3:
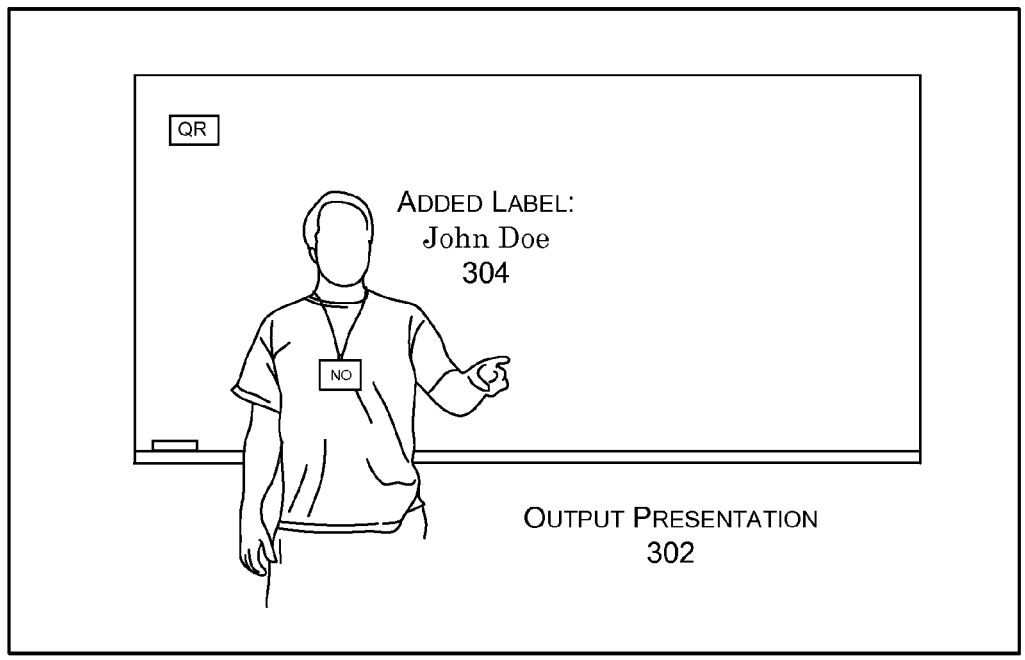
FIG. 3 shows an illustrative output presentation produced by the framework of FIG. 1, in response to the scenario of FIG. 2.

FIG. 3 shows an illustrative output presentation 302 that is generated by framework 102, in response to the scenario of FIG. 2. Assume that the first policy causes the management module 110 to remove the video portion of the scene associated with the writing 216, before sending that that video information to the applications. Assume that the second policy causes the management module 110 to similarly remove the video portion of the scene associated with the first person's face 208 before sending that video information to the applications. Assume that the third policy imposes no constraints on the collection of video information, but may block the passage of audio information to the applications. Assume that at least one of the applications annotates the output presentation 302 with a label 304, which identifies the name of the individual in the output presentation 302, if known to the application based on face detection technology.

In the above example, the policies affect all applications in the same manner. But this is not necessarily the case. A policy can specify that a first application is permitted to receive video information, but a second application is not so permitted. For example, a first application may enjoy more privileges than other applications because the first application is trusted, while the second application is not. Consider, for instance, the case in which a company creates a particular native application that consumes information extracted from an environment. The company may create a policy for its campus that grants its own application favored status, over the applications of others.

A.3. The Management Module

Figure 4:
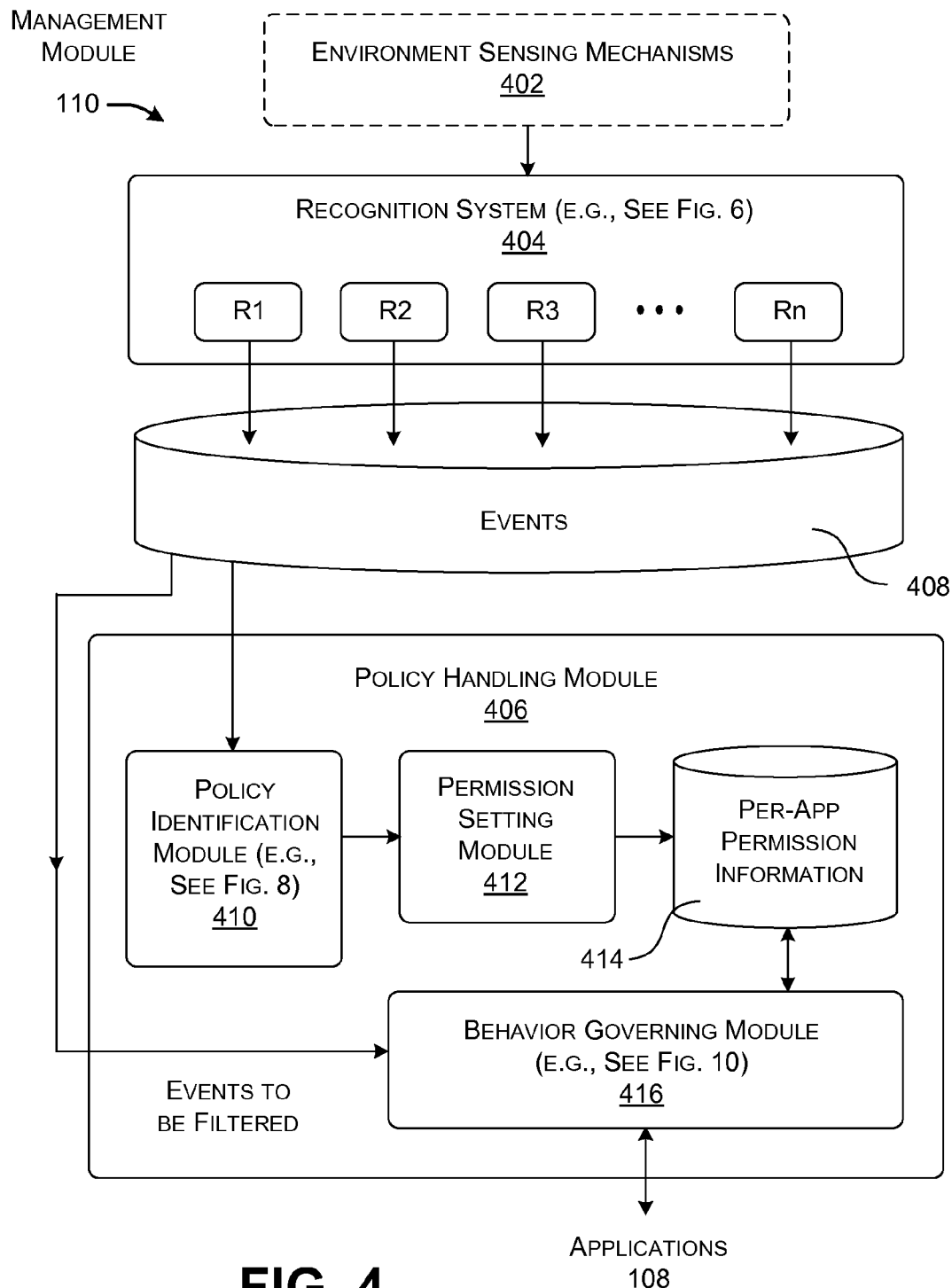
FIG. 4 shows further illustrative details of a management module, which is a component of the framework of FIG. 1. The management module includes, in turn, a recognition system and a policy handling module.

FIG. 4 shows one implementation of the management module 110, introduced in the context of FIG. 1. The management module 110 includes three main components: environment sensing mechanisms 402, a recognition system 404, and a policy handling module 406.

The environment sensing mechanisms 402 include any sensors and devices for collecting perceptual information (also referred to as raw data) from the environment 106. The environment sensing mechanisms 402 may include, for example, any of the mechanisms in the following non-exhaustive list: video cameras, static picture cameras, depth camera devices (such as the Kinect™ device produced by Microsoft® Corporation of Redmond, Wash.), microphones, voice recognition mechanisms, physiological sensors of any type, motion-sensing devices (such as accelerometers, gyroscopes, etc.), position-sensing devices (such as GPS mechanisms, dead-reckoning mechanisms, triangulation mechanisms, etc.), olfactory input devices, vibration detection devices, pressure gauges, and so on.

Some of the sensing mechanisms 402 may be integrated into the housing associated with the computing device. Other sensing mechanisms 402 may be communicatively coupled to the computing device, but local to the computing device. Other sensing mechanisms may be remotely located with respect to the computing device. Other sensing mechanisms may be distributed over plural locations.

Some sensing mechanisms 402 may also be specifically configured to detect the presence of triggering cues in the environment 106. For example, a video recognizer may be designed that is narrowly tailored to detect a QR code, rather than providing a high-quality image of the overall scene in which the QR code appears. The framework 102 can benefit from the use of such a sensing mechanism because: (a) it may provide more accurate information compared to a general-purpose sensing mechanism; and/or (b) it may consume fewer resources (e.g., power resources) compared to a general-purpose sensing mechanism.

The recognition system 404 receives and processes the perceptual information provided by the sensing mechanisms 402, to provide a collection of events. Each event expresses some feature of the environment 106, such as an object, occurrence, etc. Each event identifies the recognizer from which it originates. Each event also includes a payload that describes its feature, expressed in any manner (e.g., using a data structure, etc.). A data store 408 may buffer the events.

More specifically, the recognition system 404 may use a collection of recognizers to produce the events. Each recognizer receives input information, applies some predetermined operation to the input information to yield output information, and provides an event that expresses the output information. The input information may originate from one or more sensing mechanisms and/or one or more other recognizers. For example, a voice recognizer may convert raw audio information received from a microphone to a stream of recognized words. A particular event in this case may correspond to one or more words recognized in a particular time frame. A code recognizer may convert video information produced by a video camera to a digital code. A particular event in this case may correspond to code information extracted from one or more video frames.

The policy handling module 406 determines policies (if any) based on the events, and then governs the behavior of the applications 108 based on the policies. To perform this task, the policy handling module 406 includes a policy identification module 410, a permission setting module 412, a data store 414, and an application behavior governing module 416.

The policy identification module 410 detects the presence of one or more policies based on cues in the environment 106, as expressed by events in the data store 408. For example, the event stream produced by a code recognizer may indicate the presence of a trigging code-bearing cue. The policy identification module 410 also performs other functions described in a later subsection, such as validating the policies based on their respective digital certificates. The permission setting module 412 sets application permission information on a per-application basis based on the policies identified by the policy identification module 410. The data store 414 stores the application permission information produced by the permission setting module 412, which may include, in part, entries in an access control list. In the absence of a discovered policy affecting the rights of an application, the data store 414 may provide default application permission information for the application. The application behavior governing module 416 governs the behavior of one or more applications 108 based on the application permission information stored in the data store 414.

Figure 5:
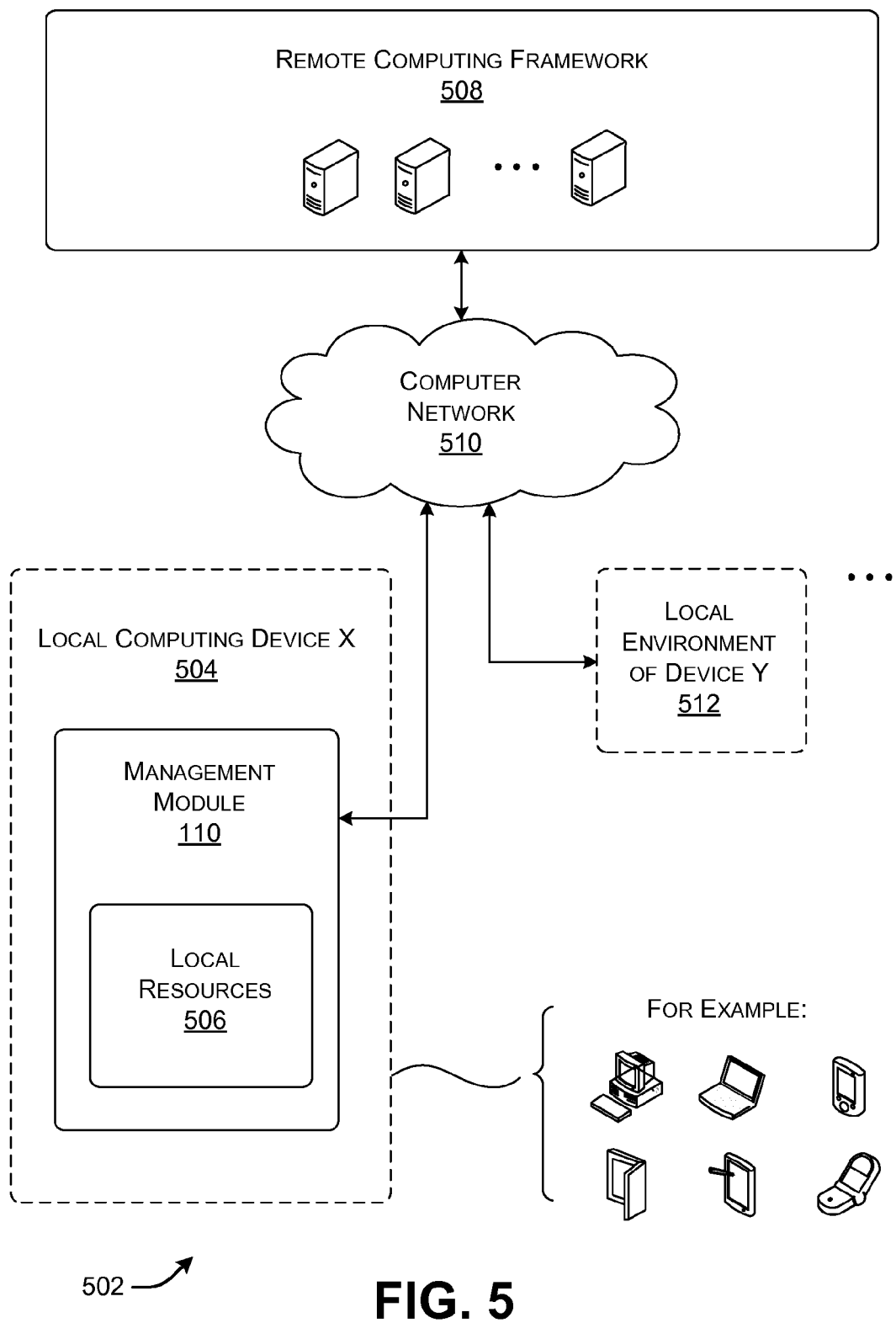
FIG. 5 shows one implementation of the management module of FIG. 4.

FIG. 5 shows one computer-implemented system 502 that can implement the management module 110 of FIG. 4, associated with one instance of the functionality 104 of FIG. 1. The system 502 includes a local computing device 504, such as any of the types computing devices mentioned in Subsection A.1 (e.g., a smartphone, a tablet-type computing device, etc.). In one case, the local computing device 504 implements all aspects of the management module 110.

In another implementation, the local computing device 504 can implement some aspects of the management module 110 using local resources 506, while a remote computing framework 508 may implement other aspects of the management module 110. The remote computing framework 508 may be implemented as one or more remote server computing devices. The local computing device 504 may interact with the remote computing framework 508 via any computer network 510, such as a local area network, a wide area network (e.g., the Internet), point-to-point links, and so forth.

In one illustrative allocation of functions, the local computing device 504 can implement one or more local recognizers, while the remote computing framework 508 can implement one or more remote recognizers. Hence, the recognition system 404 in this system 502 is distributed over at least two different locations. More specifically, the remote computing framework 508 can handle the most computationally intensive recognizers in the recognition system 404, such as those recognizers that perform complex image processing tasks (such as, in one case, a face recognition task).

A remote component (such as a remote recognizer) of the remote computing framework 508 may provide service to any number of local computing devices at the same time. For example, the remote component may provide service to both the local computing device 504 and another local computing device 512. In this way, the remote component simulates the operation of a virtual machine (by providing service to two or more independent tasks on the same physical platform).

A.4. The Recognition System

Figure 6:
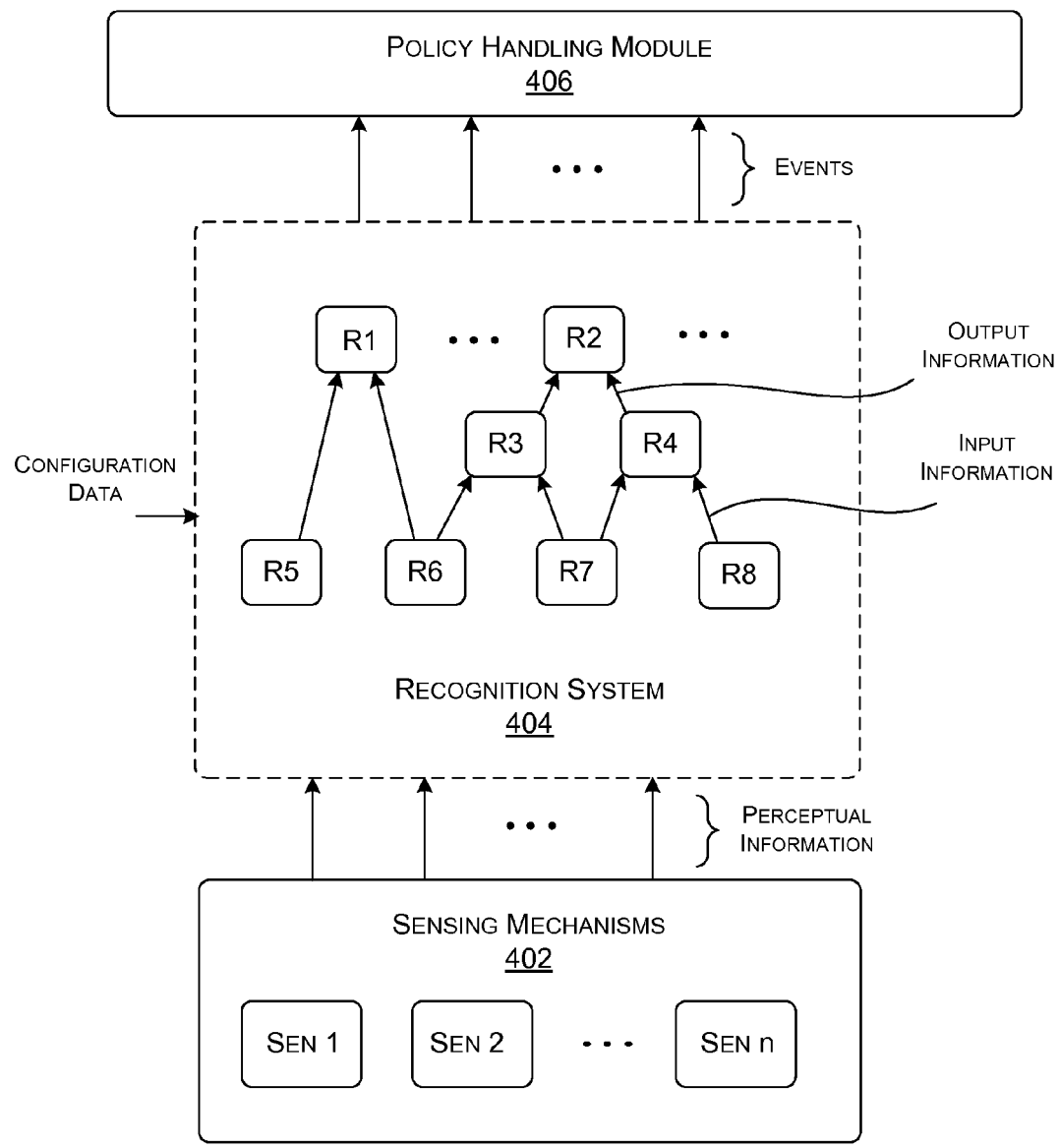
FIG. 6 shows one implementation of the recognition system of FIG. 4.

FIG. 6 shows one illustrative implementation of the recognition system 404, introduced in FIG. 4. As set forth in the previous subsection, the recognition system 404 operates by receiving perceptual information from one or more sensing mechanisms 402. The recognition system 404 then analyzes the perceptual information using one or more recognizers. Each recognizer transforms input information into output information. The output information expresses some aspect of the input information, referred to herein as an event.

The input information that is fed to any recognizer may originate from one or more other recognizers. As a whole, then, the recognition system 404 forms a data flow graph composed of one or more recognizers. The recognition system 404 dynamically constructs the data flow graph to supply whatever events are requested by the applications that are running at a particular time.

Figure 7:
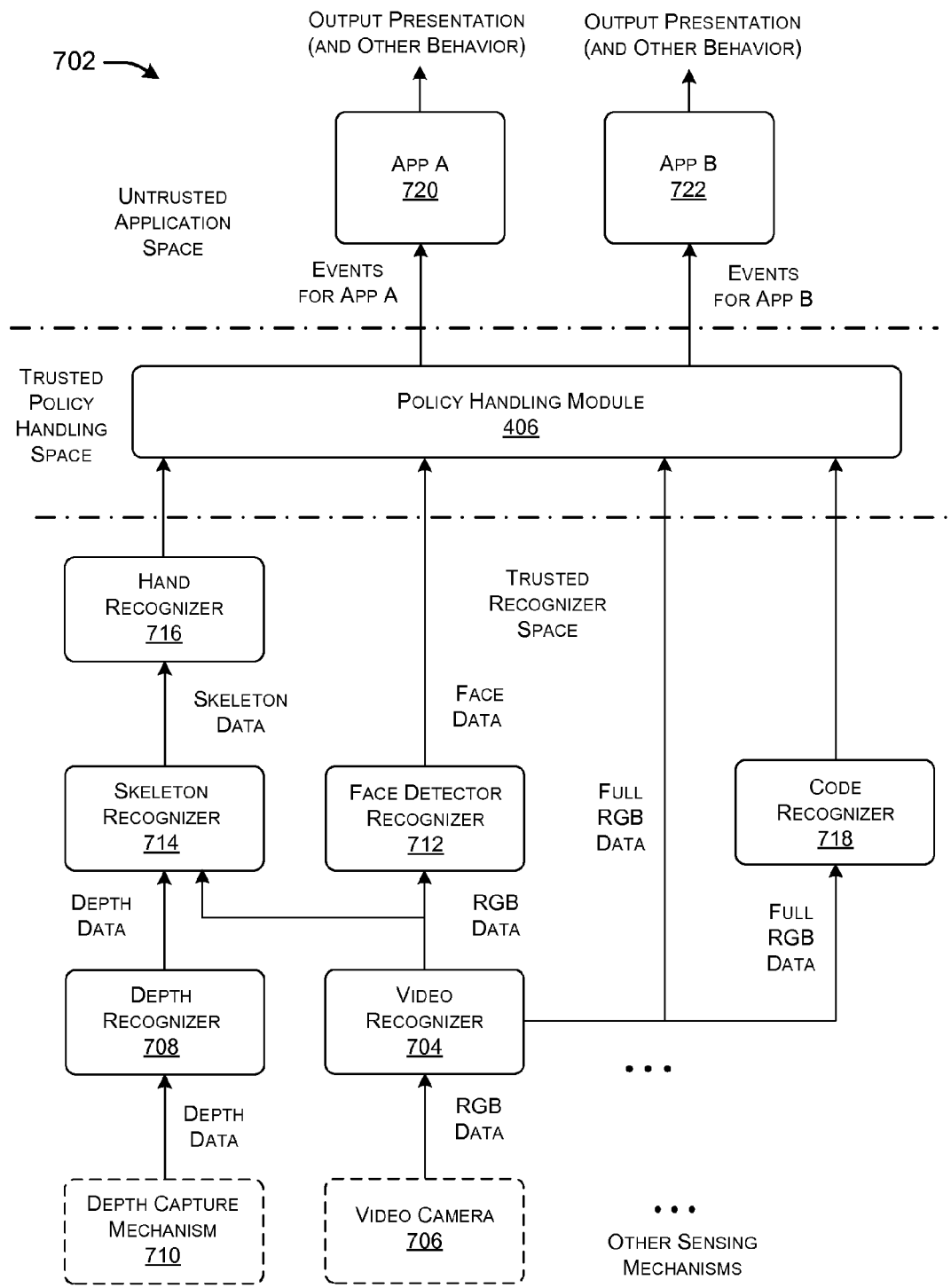
FIG. 7 shows a yet more specific implementation of the recognition system of FIG. 4.

FIG. 7 shows one implementation of a recognition system 702, as it appears at a particular time, for a particular subset of running applications. The recognition system 702 includes a video recognizer 704 which receives raw RGB data from a video camera 706, and outputs an event expressing the same raw video data. In other words, the video recognizer 704 may correspond to a driver which drives the video camera 706. The recognition system 702 also includes a depth recognizer 708 which receives a depth image from a depth capture mechanism 710, and outputs a depth event that expresses the depth image. In other words, the depth recognizer 708 may constitute a driver of the depth capture mechanism 710. The depth capture mechanism 710, in turn, can use any technology to produce a depth image, such as a structured light technique, a time-of-flight technique, a stereoscopic technique, and so forth. In one case, the sensing mechanisms (e.g., the video camera 706 and the depth capture mechanism 710) remain "on" in a continuous access state, regardless of whether events, derived from the output of these mechanisms, eventually reach the applications 108. In other words, as mentioned above, the point of access throttling is the policy handling module 406, not the on/off state of the sensing mechanisms 402.

A face detector recognizer 712 receives the RGB event generated by the video recognizer 704, to generate a face event. The face event includes data that describes the face of a person in the scene, if a person is present in the scene, but without revealing the full RGB data associated with the face. A skeleton recognizer 714 receives input events from the depth recognizer 708 and the video recognizer 704. Based on these input events, the skeleton recognizer 714 generates a skeleton event which describes the pose of any person in the scene, if a person is present. A hand recognizer 716 receives the skeleton event and provides an output event that describes the positions and orientations of the person's hands. A code recognizer 718 identifies the presence of a code-bearing label, such as a QR code, and identifies the code associated with that label. As can be appreciated, the above set of particular recognizers is cited by way of illustration, not limitation.

In the manner described above, the policy handling module 406 receives all of the above-described events and buffers them in the data store 408. The behavior governing module 416 then consults the application permission information in the data store 414 to determine whether to forward events to applications that have requested these events. For example, an application A 720 receives a first set of events, if permitted, while an application B 722 receives a second set of events, if permitted. The behavior governing module 416 may optionally modify some of the events prior to sending them to the requesting applications.

A.5. The Policy Identification Module

Figure 8:
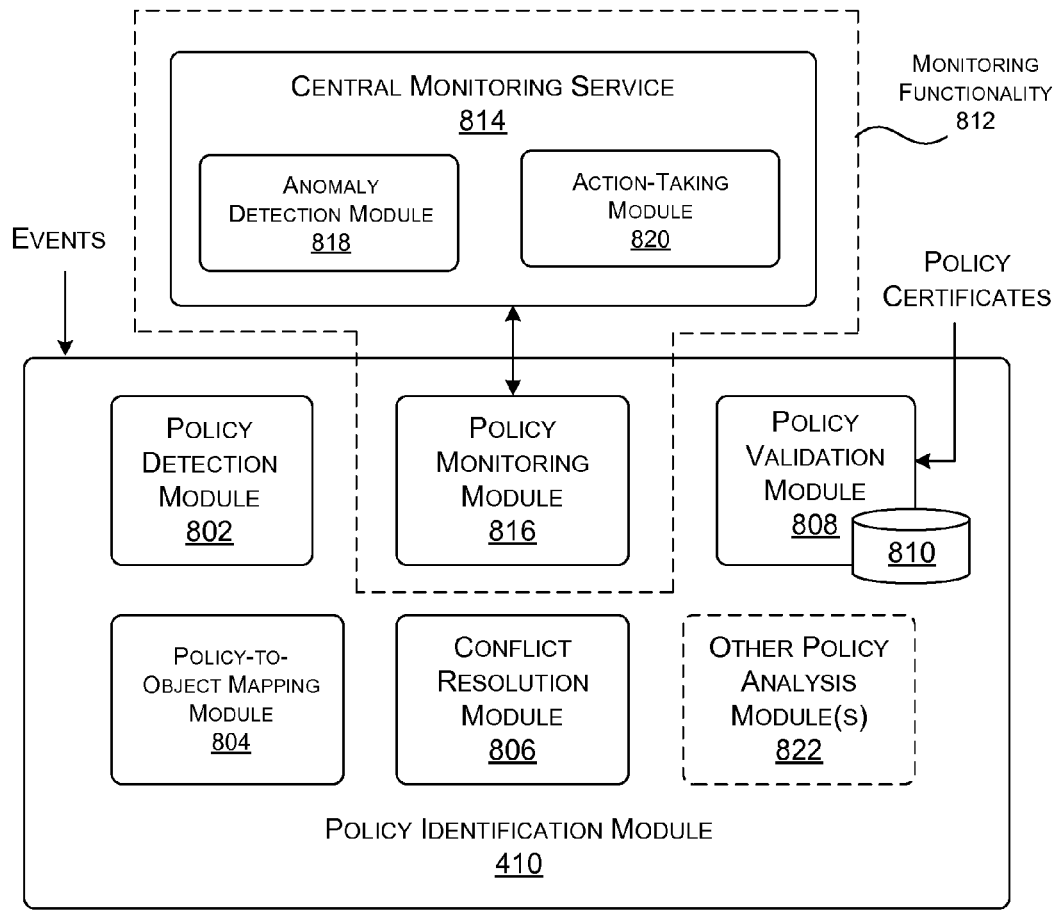
FIG. 8 shows one implementation of a policy identification module, which is a component of the policy handling module of FIG. 4.

FIG. 8 shows one implementation of the policy identification module 410, introduced in the context of FIG. 4. The policy identification module 410 includes, or can be conceptualized as including, various subcomponents that perform respective tasks. The overall function of the policy identification module 410 is to associate a particular "snapshot" of the environment 106, as expressed by one or more events, with one or more policies.

Policy Detection Module.

To begin with, a policy detection module 802 examines events that have been received to determine whether they convey triggering cues, which, in turn, invoke respective policies. The policy detection module 802 can be configured to identify the presence of triggering cues by looking for telltale information expressed by the events. In one case, for example, the policy detection module 802 can examine the output streams of recognizers that are dedicated to detecting the presence of certain cues. For instance, the policy detection module 802 can identify the presence of a QR code by examining the output stream of a recognizer that is specially designed to identify QR codes within video information. The policy detection module 802 can then determine whether the detected QR code points to a policy, or conveys some other information unrelated to the identification of policy information. In another case, the policy detection module 802 can perform additional analysis on one or more events to determine the presence of triggering cues, such as by analyzing a stream of audio information to detect the sound of a flushing toilet; such an occurrence indicates that the user is present in a bathroom environment.

The policy detection module 802 may perform its analysis by consulting a configurable and extensible cue detection component (not shown). That component may provide whatever information and/or code that is used to identify the presence of particular triggering cues in events that are received. Less formally stated, that component tells the policy detection module 802 what cues to look for in the environment.

Upon detecting a cue, the policy detection module 802 can retrieve policy information regarding the cue. For instance, again suppose that an event stream identifies the presence of a QR code. The policy detection module 802 can identify a link associated with the QR code. The policy detection module 802 may then use the link to retrieve policy information pertaining to whatever policy is associated with the QR code. As described in Subsection A.1., the policy detection module 802 can obtain the policy information from any local and/or remote source(s). In one case, the policy detection module 802 receives a digital certificate, which encapsulates all of the policy information. In another case, the policy detection module 802 obtains the policy information from two or more separate sources, one of which may correspond to a certificate.

Mapping Module.

A mapping module 804 may associate a detected policy with a target feature, corresponding to the object or event to which the policy pertains. In some cases, the association between a policy and a target feature is expressly stated by the policy information itself. For example, the code-bearing label 218 of FIG. 2 may point to policy information, and that policy information may expressly specify that the policy being invoked pertains to a whiteboard object.

In other cases, the mapping module 804 can use various strategies to infer the association between a detected policy and a target feature. In the visual realm, for example, the mapping module 804 can associate the policy with whatever object lies within a prescribed distance of the policy's triggering cue, or within a defined bounding box that is formed around the triggering cue. Distance can be assessed in any number of dimensions by leveraging depth information provided by a depth camera. In addition, or alternatively, the mapping module 804 can determine the boundary of an object based on video information and/or depth information, and assign a policy to the object if the triggering cue appears to lie within the boundary. For example, the mapping module 804 can determine that the label associated with the badge 210 in FIG. 2 belongs to the first person 204 because the badge 210 lies within the boundary associated with the first person 204. In other cases, a recognized object itself may serve as a triggering cue, such as a recognized human, a recognized vehicle, etc. Here, the mapping module 804 can assign the policy to the recognized object. The mapping module 102 can apply yet other strategies for associating policies with target features.

Conflict Resolution Module.

A conflict resolution module 806 addresses the situation that occurs when two or more policies are associated with the same target feature, and these policies conflict with each other. For example, a first policy may indicate that an application is permitted to receive face data associated with the face of a person, while a second policy may indicate that the same application is prohibited from receiving the face data. The conflict resolution module 806 can use different rules to resolve conflicts of this nature, selected from a configurable database (not shown) of such rules.

In one case, the conflict resolution module 806 can choose the policy that is most conservative, and is therefore safest. In one setting, the most conservative strategy may involve placing restrictions on information that is sent to an application. In another setting, such as in a store surveillance environment, the more conservative choice may entail allowing an application to record the environment.

Alternatively, or in addition, each policy may be tagged with a priority level or other type of conflict-resolution information. The conflict resolution module 806 can pick the policy having the highest priority level. In one case, the policy information associated with a policy can communicate the priority level associated with the policy with respect to one or more other types of policies. Indeed, in one implementation, the digital certificate itself can convey this information.

In addition, or alternatively, the conflict resolution module 806 can expressly ask the user who is operating the computing device how to resolve a conflict, particularly in those cases in which there is no other basis for choosing among competing policies.

In certain cases, the user may also opt to override a particular policy recommendation made by the policy identification module 410, e.g., by ignoring the policy, or substituting a user-selected policy for the recommended policy. The conflict resolution module 806 can address this situation in different ways. In one implementation, each policy is tagged with a mandatory status or a suggested status. A mandatory status, for instance, may indicate that the policy affects the privacy of other individuals within the environment 106, not just the user performing the recording. The conflict resolution module 806 can place more constraints on the ability of a user to override a mandatory policy, compared to a suggested policy. For example, the conflict resolution module 806 can display a warning message when the user seeks to override a mandatory policy, and optionally asks the user for express permission to proceed, or to obtain additional authorization to proceed.

Ultimately, the framework 102 may not be able to force the user to obey any of its policies, as the user may decide to use a legacy recording device to record the environment 106, which does not incorporate the provisions of the framework 102. Nevertheless, the framework 102 still serves as reminder to conscientious users regarding desirable recording practices within particular environments. For instance, the framework 102 alerts the users to the privacy concerns of others, which otherwise may not be apparent to the users.

Policy Validation Module.

A policy validation module 808 determines whether an identified policy is valid. Validity analysis may include multiple phases, performed in series or in parallel. In a first phase, the policy validation module 808 may determine whether the policy has a digital certificate which originates from the PA entity 116. The policy validation module 808 can make this determination by using the public key 120 of the PA entity 116 to decrypt the digital certificate. If that decryption is successful, then the PA entity 116 can conclude that the digital certificate originates from the PA entity 116. If decryption is not successful, the policy validation module 808 can ignore the policy, as it may originate from a fraudulent source.

The policy validation module 808 can address policies which entirely lack digital certificates in different implementation-specific ways. In some cases, the policy validation module 808 can ignore polices which lack certificates—that is, by not applying them. In other cases, the policy validation module 808 can look to various factors to determine whether to apply a policy that lacks a certificate, such as the risk of hijacking the policy, the threat posed by hijacking the policy, the nature of the current environment being sensed, the nature of the target feature in question, and so on. In addition, or alternatively, the policy validation module 808 can provide a warning message to the user or the like when it applies a policy without a certificate; or the policy validation module 808 can apply the warning message before it applies the suspect policy, coupled with a prompt that asks the user for permission to proceed.

In a further phase of validation processing, the policy validation module 808 can consult context information conveyed by the digital certificate. The context information identifies the context in which the policy is intended to be applied in the environment 106. The policy validation module 808 can compare the described context with the actual context in which the policy is being applied in the environment. If they do not match, then the policy validation module 808 can ignore the policy, or take any other implementation-specific action described above.

For example, consider a policy which applies to a particular owner's house. The context information can describe the house, such as by providing the GPS coordinates of a bounding box associated with the house. When this policy is invoked, the policy validation module 808 can determine whether the user is currently located within the bounding box associated with the house. If not, then the policy validation module 808 can decline to apply the policy. In other cases, the context information can describe a target object by any other of its properties, such as its visual and/or acoustic characteristics, etc.

The policy validation module 808 can apply yet additional phases of analysis to determine whether a policy is valid. The policy validation module 808 may conclude that a policy is valid if it passes all phases of its validation processing. The policy validation module 808 can perform its tests at any stage of analysis. In one case, the policy validation module 808 performs its tests at the time that a policy is invoked, e.g., at the time that a triggering cue associated with the policy is encountered. In another case, the policy validation module 808 can perform at least some of the tests in advance of encountering the policies within an environment. For example, the policy validation module 808 can determine whether a policy is authentic (meaning that it originates from the PA entity 116) at a preliminary stage, before encountering the policy in an environment (assuming that the certificate that is checked is up to date).

The policy validation module 808 can store policy information in a local data store 810 (and/or a remote data store, not shown). The policy information may include a collection of certificates associated with policies.

Policy Monitoring Functionality.

Policy monitoring functionality 812 determines whether an anomaly has occurred in the application of one or more policies. The policy monitoring functionality 812 then takes one or more threat-ameliorating actions when an anomaly is detected. In one particular case, the policy monitoring functionality 812 detects and responds to the situation in which a triggering cue has been removed from an environment or otherwise disabled, either maliciously or inadvertently.

The policy monitoring functionality 812 may have local and/or remote components. For example, the policy monitoring functionality 812 may include a central monitoring service 814, e.g., as implemented by one or more server computing devices in association with one or more data stores. The central monitoring service 814 may communicate with a policy monitoring module 816 provided by each instance of the policy identification module 410, provided by each respective computing device which is recording an environment. The central monitoring service 814 may interact with local monitoring modules via any kind of computing network, such as the Internet.

In one implementation, an anomaly detection module 818 provided by the central monitoring service 814 may receive report information from different instances of the policy monitoring module 816, provided by respective computing devices. In the context of FIG. 1, an instance of the report information may describe the manner in which the management module 110 is applying policies within the environment 106. That report information, in turn, may describe the policy-triggering cues that the management module 110 encounters within the environment 106. The anomaly detection module 818 may then determine discrepancies in the application of policies associated with a particular environment.

For example, the anomaly detection module 818 can identify a potential anomaly when it finds that different computing devices are applying different policies within the same environment. In another case, the anomaly detection module 818 can identify a potential anomaly when it finds that some computing devices are consistently applying a policy, but other computing devices are not. The anomaly detection module 818 can also identify a potential anomaly when it finds that one or more computing devices cease applying a policy in an environment (e.g., because they cease detecting a triggering cue), when the policy has not been revoked by it owner.

An action-taking module 820, provided by the central monitoring service 814, can take various forms of threat-ameliorating actions when it detects that an anomalous condition has likely occurred. For example, the action-taking module 820 can generate an alarm to a user who is operating a computing device that seems to be generating anomalous report information. In addition, or alternatively, the action-taking module 820 can generate an alarm to all users who are operating computing devices within the affected environment. In addition, or alternatively, the action-taking module 820 can modify the permissions granted to applications running on affected computing devices, e.g., to prevent applications from recording the environment 106 in some cases. In addition, or alternatively, the action-taking module 820 can notify the owner associated with a misbehaving policy. In addition, or alternatively, the action-taking module 820 can dispatch a technician to check on the sensing mechanisms in the affected environment, and so on.

The central monitoring service 814 may also collect other information that can be used to improve the design and application of policies. For example, the central monitoring service 814 can receive information that indicates that a large number of users are overriding a particular policy in a particular environment. The central monitoring service 814 may notify the policy owner, who may then decide to make various changes to address this situation, such as by relaxing certain constraints of the policy to make it more acceptable to end users.

Alternatively, or in addition, some monitoring and threat-ameliorating functions can be performed by each local instance of the policy monitoring module 816. For example, the policy monitoring module 816 can store a history of the management module's behavior in a particular environment over a span of time. The policy monitoring module 816 can then compare the management module's current behavior in that environment with the past behavior. If there is a disagreement, the policy monitoring module 816 can take any type of threat-ameliorating action. For example, the monitoring module 816 may take correction action when it determines that a particular policy has been active within a particular bathroom over the last month, but is now no longer active—and that this difference cannot be attributed to known causes, such as the receipt of modified policy information for the bathroom, legitimately authored by the bathroom's owner. In another case, the policy monitoring module 816 can detect the abrupt removal of a triggering cue while the computing device is within a particular environment, e.g., indicating that a radio beacon has been jammed or otherwise disabled by someone.

Other Modules.

Finally, FIG. 8 indicates that the policy identification module 410 may include any other policy analysis modules 822 which perform any other policy-related functions.

Figure 9:
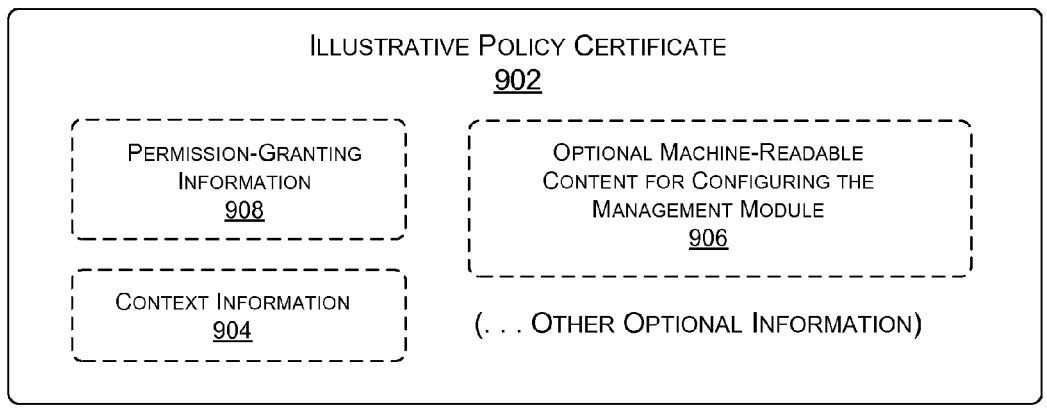
FIG. 9 shows an illustrative digital certificate that may be generated by a trusted passport authority (PA) entity, in the framework of FIG. 1.

FIG. 9 shows one implementation of a digital certificate 902 associated with a particular policy. The certificate 902 includes context information 904 which describes a context (or contexts) to which the policy applies. The context can be described in different ways depending on the nature of the target feature associated with the policy. Consider the case in which the target feature corresponds to a location. The context information can describe a bounding box of locations to which the policy applies. Consider another case in which the target feature corresponds to a particular car. The context information can identify the car in any manner, such as by providing its license plate number (which can be detected by a video camera in the field). Consider another case in which the target feature corresponds to a general type of object, such as faces of people. The context information can describe the general visual characteristics of faces by which face recognition algorithms discriminate face data from non-face data, and so on.

The certificate 902 also includes optional machine-readable content 906, such as instructions (e.g., code, etc.), configuration settings, etc. The management module 110 can use the machine-readable content 906 to configure any aspect of its functionality to allow that functionality to more effectively detect and/or process the policy under consideration. For example, the machine-readable content 906 may correspond to code that implements a new recognition algorithm for use by a particular recognizer. That recognizer may use the new algorithm to detect the triggering cue associated with the policy, to which the certificate 902 pertains. In another case, the machine-readable content 906 may configure the policy detection module 802 to look for a particular type of triggering cue in one or more events. In another case, the machine-readable content 906 may provide an algorithm for ranking the policy with respect to other conflicting policies, and so on. In another case, the machine-readable content 906 may provide an algorithm for performing post-processing on an event, before the event is sent to a subscribing application.

In some cases, the management module 110 is able to use the machine-readable content 906 the first time that a policy is encountered, e.g., upon loading a certificate (which provides the machine-readable content 906) when a triggering cue for the policy is first encountered in the environment. In other cases, the management module 110 can use the machine-readable content 906 to more effectively process the policy the next time it is encountered in the environment, but perhaps not the first time. For example, the management module 110 may detect a policy using a first recognizer algorithm. The certificate of that policy, in turn, may specify a new recognizer algorithm that the management module 110 may use to more efficiently and accurately detect the policy. The management module 110 may use that new recognizer algorithm in the future to detect the policy. In other situations described in Subsection A.1, the management module 110 can load certificates in a preliminary configuration operation, in advance of detecting the corresponding policies.

In general, the use of certificates to convey machine-readable content 906 provides a convenient way of dynamically adapting the management module 110 upon the introduction of new policies, new recognition algorithms, and so on. This aspect contributes, in turn, to the flexibility and extensibility of the management module 110 as a whole.

The policy certificate 902 may include yet other items of information. For example, the certificate 902 may include permission-granting information 908, which identifies the permissions which the corresponding policy confers to one or more applications.

A.6. The Behavior Governing Module

Figure 10:
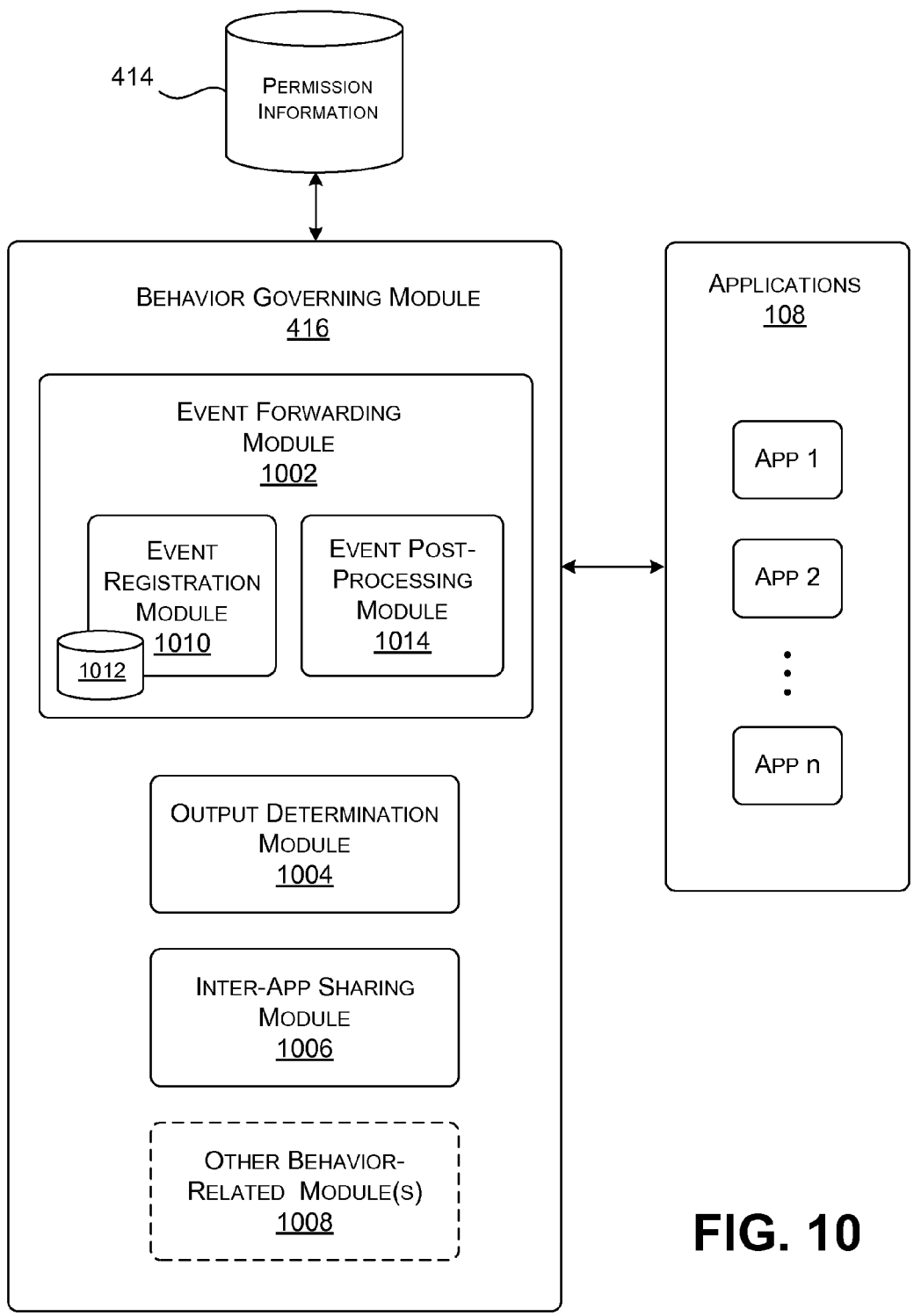
FIG. 10 shows one implementation of a behavior governing module, which is a component of the policy handling module of FIG. 4.

FIG. 10 shows one implementation of the behavior governing module 416, which governs the behavior of one or more applications 108 based on the application permission information provided in the data store 414.

The behavior governing module 416 includes an event forwarding module 1002 which controls the forwarding of events from the recognition system 404 to the applications 108 based on the application permission information. An output determination module 1004 controls what types of information each application is permitted to send to each output device, such as a display mechanism. The output determination module 1004 may also control how the output information generated by a first application interacts with the output information generated by a second application. An inter-app sharing module 1006 controls what information each application is allowed to share with other applications and/or other entities. The other behavior-related module(s) 1008 indicates that the behavior governing module 416 can control any other aspect of the applications' behaviors, such as by controlling what code an application is permitted to run, by controlling the on/off state of a camera's flash device or a telephone's ringers, etc.

The event forwarding module 1002 can operate in the following matter. In a preliminary setup phase, each application can forward a subscription request to a registration module 1010. That request asks the registration module 1010 to forward a specified set of events to the application, whenever those events appear in the event streams generated by the recognition system 404. For example, a particular application may provide a service that depends on the recognition of people in a scene. Hence that application will register to receive events generated by a face detector recognizer. In response to a subscription request, the registration module 1010 stores subscription information for each application in a data store 1012, specifying the application's requested events.

When an event is received, the event forwarding module 1002 can consult the subscription information for each application (maintained by the registration module 1010), together with the application permission information for that application (maintained in the data store 414). If the subscription information indicates that the application has requested the event, and the application permission information indicates that the application is entitled to receive the event, then the event forwarding module 1002 can forward the event to that application.

More specifically, in some cases, the application permission information is formulated as a binary yes/no decision. Here, if the subscribing application is permitted to receive an event, the event forwarding module 1002 will provide it; if it is not permitted, the event forwarding module 1002 will prevent the application from receiving it. In other cases, the application permission information indicates that an application is entitled to receive an event only after certain specified filtering is applied to the event, such as by removing alphanumeric content in a video event stream. In some cases, the event forwarding module 1002 can actively perform this kind of filtering using an event post-processing module 1014, that is, by performing post-processing of events provided by the recognition system 404. In other cases, the event forwarding module 1002 can select from the event streams generated by different respective recognizers. For example, in the above example, the event forwarding module 1002 can select the event stream produced by a recognizer which already redacts alphanumeric content in its video frames.

In many cases, the event forwarding module 1002 can discard events that are not sent to a particular application pursuant to a particular policy. In other cases, the event forwarding module 1002 can buffer at least some of these rejected events in a local and/or remote store. An end user may then optionally revisit the decisions associated with the invoked policy, potentially causing the events to be later sent to the application that has requested them.

A.7. Illustrative Policy Invocation Details

Figure 11:
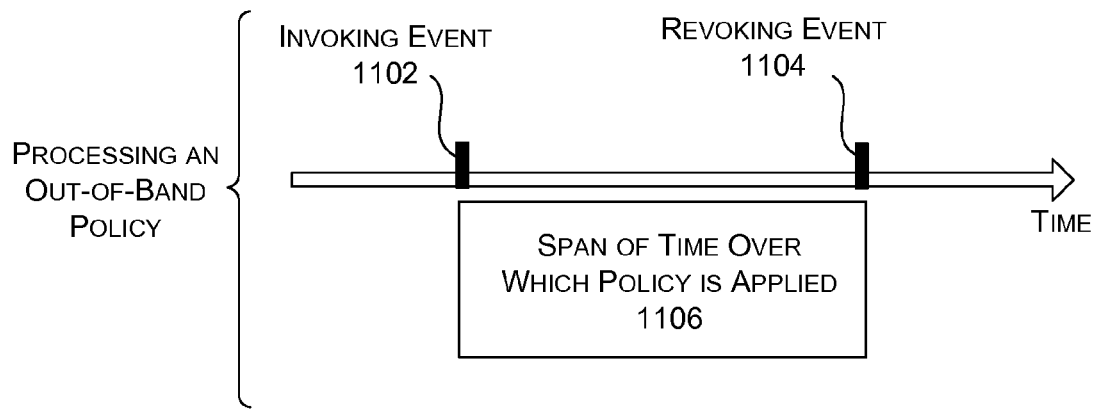
FIG. 11 is a diagram which illustrates the policy handling module's processing of an out-of-band policy.

FIGS. 11-15 provide additional details regarding one manner in which the policy handling module 406 can detect and apply different types of policies. To begin with, FIG. 11 shows the manner in which the policy handling module 406 processes an out-of-band policy. The policy handling module 406 invokes this kind of policy when it encounters an invoking event 1102, such as the presence of a "Stop Recording" sign at the entrance of a bathroom. The policy handling module 406 discontinues the policy when it encounters a revoking event 1104, such as a "Commence Recording" sign at the exit of the bathroom, or upon the detection of a time-out period, etc. The policy handling module 406 maintains the policy in an active state for a span 1106, which extends from the invoking event 1102 to the revoking event 1104. The policy handling module 406 can implement the above-described behavior by making a first change to the application permission information when the invoking event 1102 is encountered, and making a second change to the application permission information when the revoking event 1104 is encountered, e.g., by making appropriate changes to an access control list. The current state of application permission information controls the operation of the behavior governing module 416 at each particular instance of time. In the above example, the revoking event 1104 occurs in the same event stream as the invoking event 1102, but it can alternatively appear in another event stream provided by a different recognizer.

Figure 12:
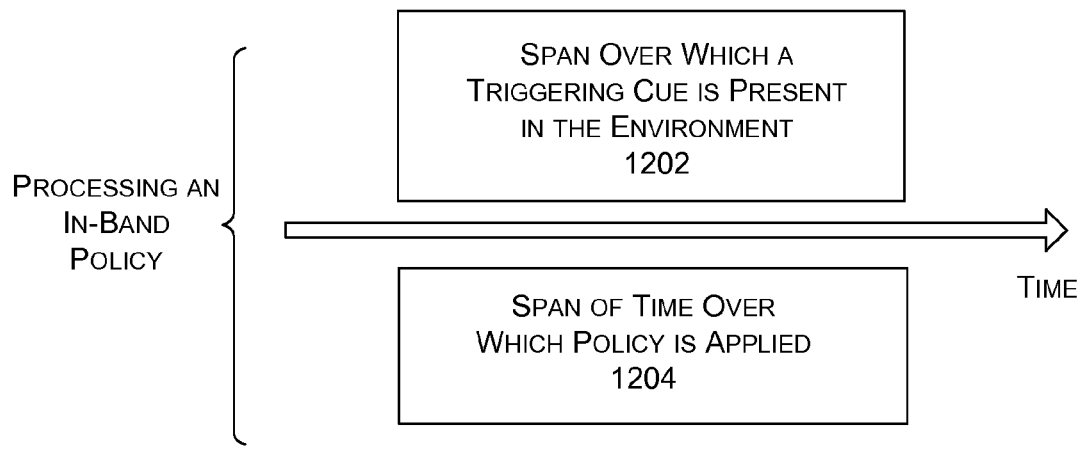
FIG. 12 is a diagram which illustrates the policy handling module's processing of an in-band policy.

FIG. 12 shows the manner in which the policy handling module 406 handles an in-band policy. In this case, assume that the events that are received from the recognition system 404 reveal that a certain triggering cue is present in a stream of events over a prescribed span 1202 of time. The policy handling module 406 maintains an associated policy for a matching span 1204 of time. For example, the policy handling module 406 may maintain a no-recording policy so long as it detects a QR code in the frames of video information, where, in one specific case, the QR code is affixed to a particular object (e.g., a credit card) or a person. Again, the policy handling module 406 can set application permission information that reflects the presence of such a triggering cue during those times at which it is detected; the application permission information, in turn, controls the operation of the behavior governing module 416.

Figure 13:
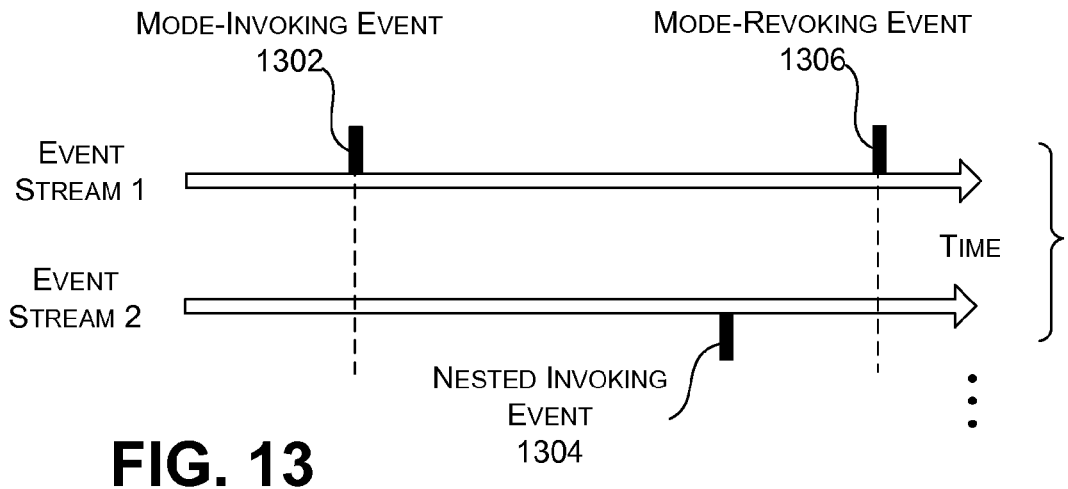
FIG. 13 is a diagram which illustrates the policy handling module's processing of plural event streams in order to detect a policy.
Figure 14:
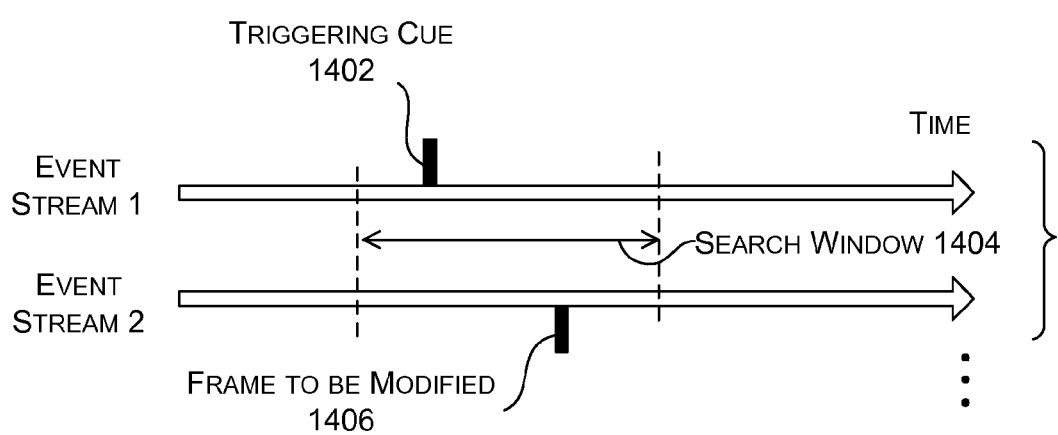
FIG. 14 is a diagram which illustrates one manner by which the policy handling module may use a triggering cue, detected in a first event stream, to modify information in a second event stream.

FIG. 13 describes the case in which the policy handling module 406 uses two types of event recognizers which rely on different respective sensing mechanisms, or the same sensing mechanism. Here, the policy handling module 406 detects a mode-invoking event 1302 in a first event stream, produced by a first recognizer. In response to the mode-invoking event 1032, the policy handling module 406 invokes a trigger-detection mode of the computing device in which the computing device examines the environment for the possible appearance of a subsequent triggering event in another event stream, such as a nested invoking event 1304 in a second event stream produced by a second recognizer. In response to this nested invoking event 1304, the policy handling module 406 invokes a particular policy. The policy handling module 406 may discontinue its trigger-detection mode when it encounters a mode-revoking event 1306 in the first event stream.

In the above example, the policy handling module 406 activates the trigger-detection mode using an out-of-band mode of operation. But the policy handling module 406 may alternatively invoke the trigger-detection mode using an in-band strategy (as shown in FIG. 12), e.g., by invoking the trigger-detection mode so long a mode-invoking event is detected in the first event stream. Similarly, the policy handling module 406 can detect the nested triggering cue in the second event stream using either an out-of-band or in-band mode of operation.

To provide a concrete case, the policy handling module 406 may invoke the trigger-detection mode when it begins to detect a triggering code conveyed by an ultrasound beacon. The policy handling module 406 may then examine the event stream produced by a video recognizer to identify the presence of a color code in the environment. That color code may invoke a policy which instructs the computing device to redact any object which is colored with the identified color (associated with the color code).

The strategy illustrated in FIG. 13 may have various advantages. For example, the policy handling module 406 can leverage the respective strengths of different recognizers when detecting the presence of a policy. For instance, an ultrasound recognizer is less subject to errors compared to a video recognizer, but it may not pinpoint the precise location of the object to which the policy applies. The policy detection module 406 can therefore use the ultrasound recognizer as a reliable indication that a color code is present in a general region (e.g., in a particular room), and then use the video recognizer to detect the particular object(s) associated with the color code in the region. In addition, the computing device can selectively apply the video recognizer when it encounters a mode-invoking event, which may reduce the overall processing burden placed on the computing device.

The policy handling module 406 can leverage the use of plural event recognizers in other ways. For example, the policy handling module 406 can identify the presence of a policy when it detects that any one of N possible triggering cues are present, or when it detects that any two or more of the N possible triggering cues are present. In general, by using different event recognizers to detect a policy, the policy handling module 406 can reduce the occurrence of false negatives, false positives, latency issues, etc. False positives occur when the policy handling module 406 detects the presence of a triggering cue when such a cue is not actually present in the environment. False negatives occur when the policy handling module 406 fails to detect the presence of a triggering cue when it is, in fact, present in the environment. Latency issues occur when the policy handling module 406 exhibits a delay in the detection of a policy, and/or a lag in the discontinuation of a policy.

Advancing to FIG. 14, again assume that a first recognizer generates a first event stream and a second recognizer generates a second event stream. The first event stream and the second event stream capture different aspects of the same environment. Assume next that the first stream reveals the presence of a triggering cue 1402 in the environment. In some cases, the policy that is invoked by the triggering cue 1402 instructs the policy handling module 406 to modify an event which occurs in the first event stream—that is, the same stream in which the triggering cue has been detected. But in other cases, the policy instructs that the policy handling module 406 to make a change to one or more separate event streams, such as the second event stream. For example, a video recognizer can detect the presence of a QR code in the environment. The corresponding policy may instruct the policy handling module 406 to remove voice data from an event stream produced by a separate voice recognizer, corresponding to the same span of time over which the QR code is detected.

The second event stream may be delayed with respect to the first event stream, or vice versa, e.g., because these streams emanate from recognizers that perform different functions having different levels of complexity. To address this issue, the policy handling module 406 can attempt to match the occurrence of the triggering cue 1402 in the first event stream which a corresponding point in time in the second event stream. The policy handling module 406 can perform this matching operation by finding a frame number or timestamp in the second event frame which matches the frame number or timestamp associated with the triggering cue 1402 in the first event stream. To perform this operation, the policy handling module 406 can perform a search over a search window 1404 to find a matching frame 1406 in the second event frame.

In other cases, the policy handling module 406 can apply various approximate solutions, such as by applying a preset offset to find an approximate location in the second event stream relative to the triggering cue 1402. Or the policy handling module 406 can select the most recent frame in the second event stream at the time of occurrence of the triggering cue 1402 in the first event stream. Or the policy handling module 406 can apply the corrective action to a grouping of frames in the second event stream within the search window 1404, without specifically finding the precise matching fame 1406. These approximate solutions may offer reduced accuracy compared to an exact-matching solution, but they may be quicker to execute compared to the exact-matching solution.

Figure 15:
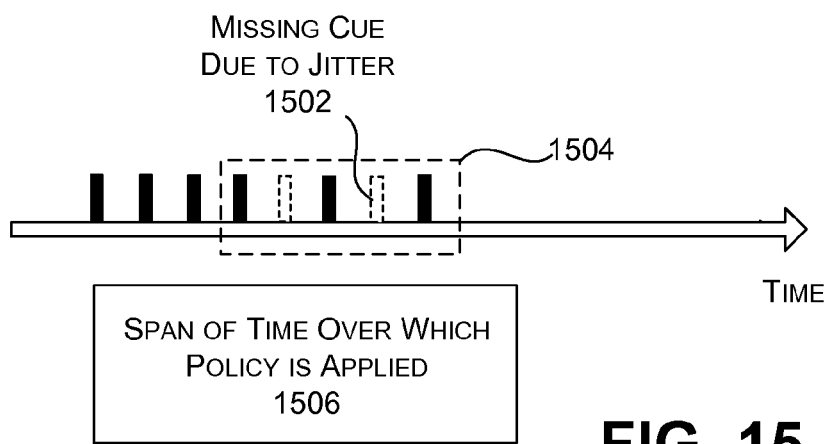
FIG. 15 is a diagram which illustrates one manner by which the policy handling module may reduce jitter in the detection of triggering cues.

FIG. 15 shows a case in which the policy handling module 406 detects a stream of triggering cues in an event stream, which act to invoke an in-band policy. However, due to recognition errors (e.g., jitter), the policy handling module 406 may fail to detect one or more triggering cues (such as triggering cue 1502), when those triggering cues are, in fact, present in the environment. The presence of jitter may cause the policy handling module 406 to momentarily discontinue the application of the associated in-band policy, resulting in degraded performance.

To address the above situation, the policy handling module 406 can continue to apply an in-band policy so long as it detects triggering cues with some level of confidence, short of 100 percent. For example, the policy handling module 406 can continue to maintain an in-band policy when it detects the triggering cues in a certain percentage of the last z opportunities to detect the cues, such as by detecting the cues in any n frames in the last z video frames, where n is 1, 2, or 3, etc. The last z opportunities or frames is associated with window 1504 in FIG. 15. By using this mode of operation, the policy handling module 406 can apply the in-band policy over a continuous span of time 1506. But this mode will also cause the policy handling module 406 to apply the policy for a short span of time after the recognition system legitimately fails to detect the presence of the triggering cues in the environment, e.g., because the computing device has moved, or due to some other reason(s) not attributed to recognition error.

As another feature (not shown), the policy handling module 406 can apply two or more policies to modify a single event stream. For example, the policy handling module 406 can apply a first filtering rule (associated with a first policy) to modify the event stream provided the recognition system 404, and apply a second filtering rule (associated with a second policy) to modify the same original event stream. The policy handling module 406 can then combine the results of these two filtering operations to provide the modified event stream which it passes to the subscribing applications. In this case, both stages of filtering operate on the original input event stream in parallel fashion, which reduces the chances that a malicious filtering operation may subvert the operation of another filtering operation. In another case, one phase of filtering can operate on the results of an earlier phase of filtering, e.g., in series, rather than operating on the original event stream.

B. Illustrative Processes

Figure 16:
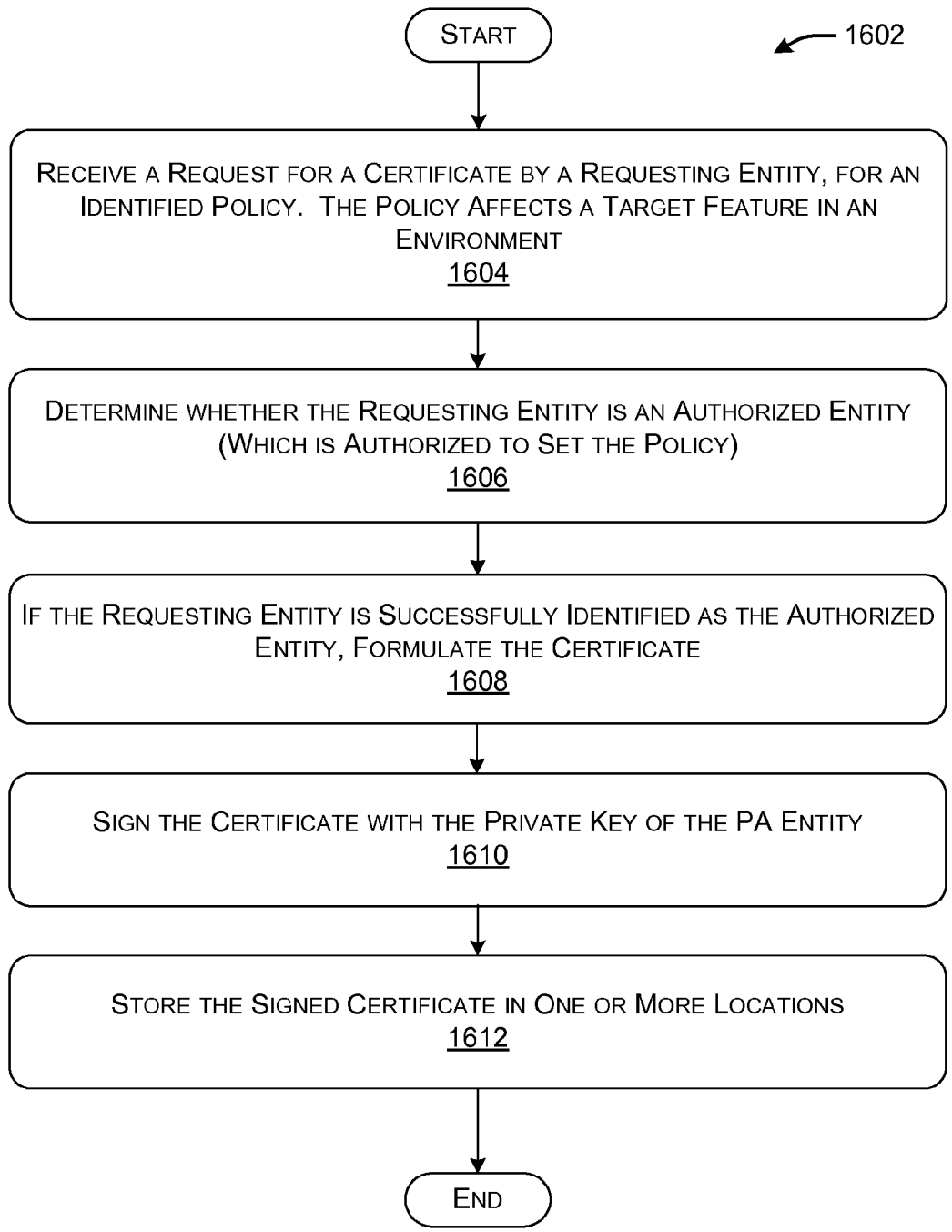
FIG. 16 is a flowchart that describes one manner by which the PA entity (of FIG. 1) can issue certificates.
Figure 17:
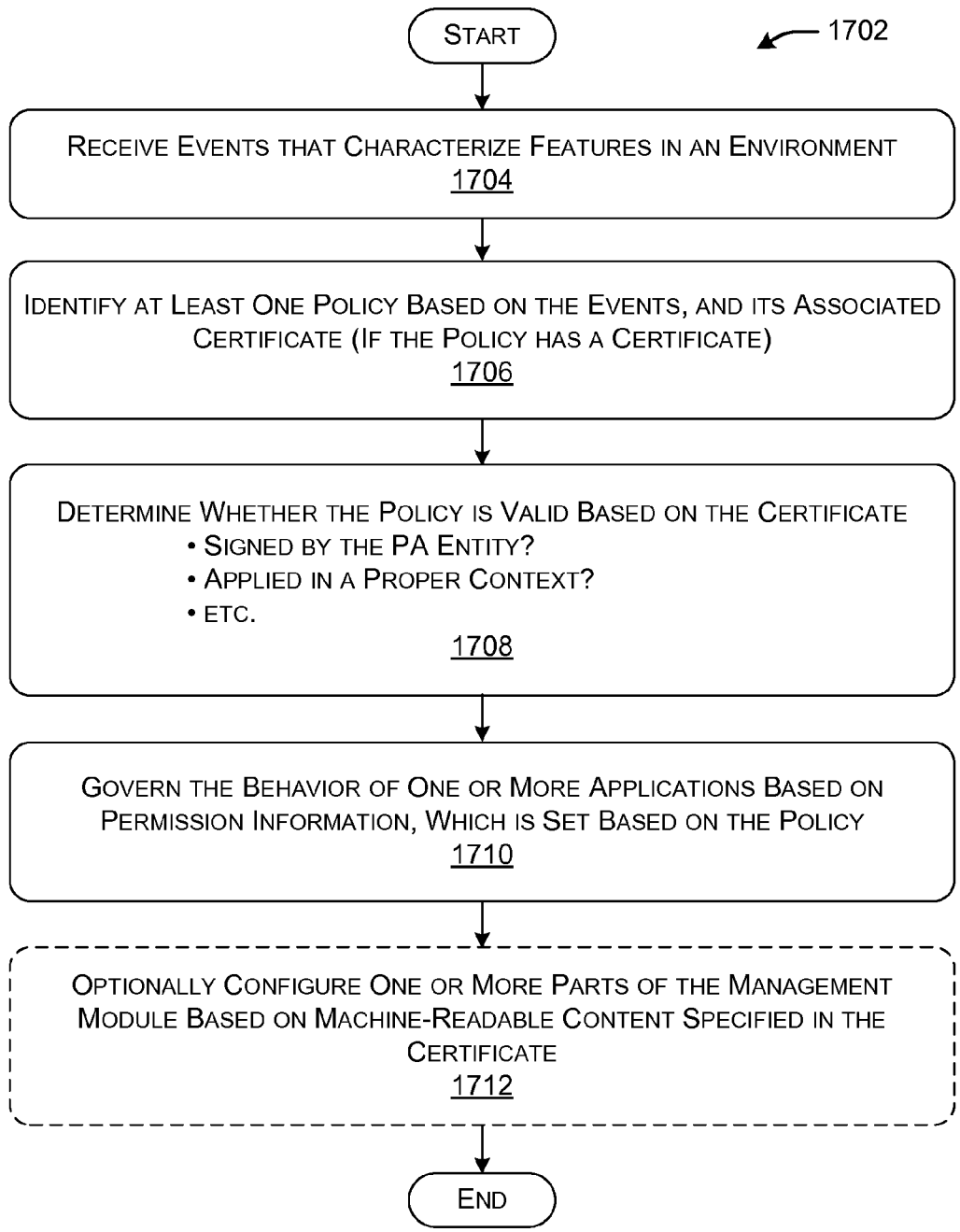
FIG. 17 is a flowchart that describes one manner of operation of the policy handling module of FIG. 4.
Figure 18:
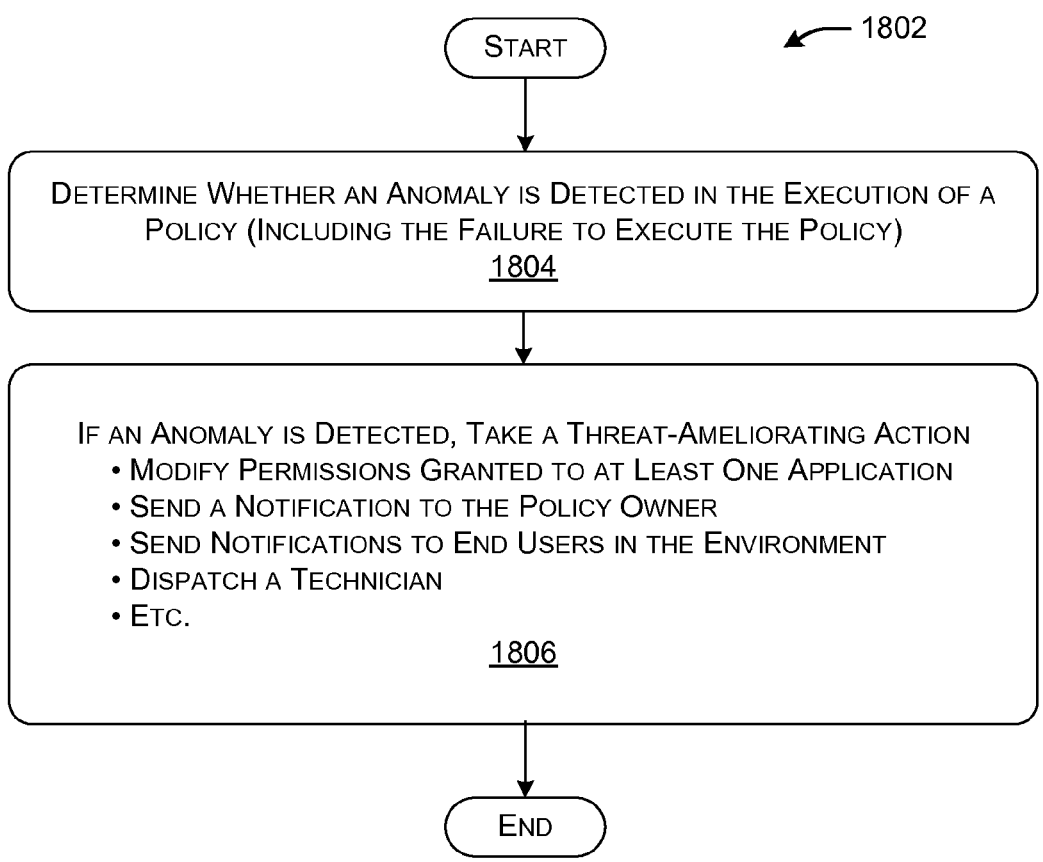
FIG. 18 is a flowchart that describes one manner by which the policy handling module (of FIG. 4) may react to an anomaly that is encountered in the execution of a policy, such as the removal of a triggering cue in an environment.

FIGS. 16-18 show procedures that explains one manner of operation of the framework 102 of FIG. 1. Since the principles underlying the operation of the framework 102 have already been described in Section A, certain operations will be addressed in summary fashion in this section.

Starting with FIG. 16, this figure shows a procedure that explains one manner of operation of the passport authority (PA) entity 116. In block 1604, the PA entity 116 receives a request for a certificate by a requesting entity, for an identified policy that affects a target feature in the environment 106. In block 1606, the PA entity 116 determines whether or the not the requesting entity is an authorized entity, meaning an entity that has proper authority to set a policy for the target feature under consideration. In block 1608, the PA entity 116 formulates a digital certificate for the policy, that is, for the case in which the requesting entity is determined to be an authorized entity. In block 1610, the PA entity 116 signs the digital certificate with its private key 118. In block 1612, the PA entity 116 may store the signed digital certificate in the data stores 124 of FIG. 1, and/or elsewhere.

FIG. 17 shows a procedure 1702 that describes one manner of operation of the policy handling module 406 of FIG. 4. In block 1704, the policy handling module 406 receives events that characterize features in an environment. In block 1706, the policy handling module 406 identifies at least one policy based on triggering cues expressed by the received events. The policy handling module 406 also identifies a certificate associated with the policy, if any. In block 1708, the policy handling module 406 determines whether the policy is valid. This operation, in turn, may include different phases of analysis, such as by determining whether the certificate originates from the PA entity 116, and then determining whether the context specified in the certificate matches the actual prevailing context in which the policy has been detected. The first phase of this processing can optionally be performed before the invocation of the policy. In block 1710, the policy handling module 406 governs the behavior of one or more applications based on the policy, if deemed valid in block 1708. More specifically, block 1710 entails using the application permission information stored in the data store 414 to govern the operation of the behavior governing module 416. In block 1712, the policy handling module 406 optionally configures one or more parts of the management module 110 based on the machine-readable content (if any) specified in the certificate. This will enable the policy handling module 406 to more effectively process the policy when it is subsequently encountered in the environment 106. In some cases, the machine-readable content can also be applied to process the policy when it is first encountered, as when, for instance, the machine-readable content describes a post-processing algorithm to be applied to events by the event post-processing module 1014 of FIG. 10.

FIG. 18 shows a procedure 1802 which represents one manner of operation of the policy monitoring functionality 812 of FIG. 8. In block 1804, the policy monitoring functionality 812 determines whether an anomaly is detected in the execution of a policy, e.g., indicating that an expected triggering cue has been removed from the environment. If so, in block 1806, the policy monitoring functionality 812 takes one or more forms of threat-ameliorating actions described in Section A.

C. Representative Computing Functionality

FIG. 19 shows computing functionality 1902 that can be used to implement any aspect of the environment-sensing framework 102 of FIG. 1. For instance, the type of computing functionality 1902 shown in FIG. 19 can be used to implement any aspect of the functionality 104 of FIG. 1, associated with one or more computing devices. The type of computing functionality 1902 shown in FIG. 19 can also be used to implement any aspect of the PA entity 116. The computing functionality 902 can also be used to implement any aspect of the central monitoring service 814 of FIG. 8. In all cases, the computing functionality 1902 represents one or more physical and tangible processing mechanisms.

The computing functionality 1902 can include one or more processing devices 1904, such as one or more central processing units (CPUs), and/or one or more graphical processing units (GPUs), and so on.

The computing functionality 1902 can also include any storage resources 1906 for storing any kind of information, such as code, settings, data, etc. Without limitation, for instance, the storage resources 1906 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1902. The computing functionality 1902 may perform any of the functions described above when the processing devices 1904 carry out instructions stored in any storage resource or combination of storage resources.

As to terminology, any of the storage resources 1906, or any combination of the storage resources 1906, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1902 also includes one or more drive mechanisms 1908 for interacting with any storage resource, such as a hard disk drive mechanism, an optical disk drive mechanism, and so on.

The computing functionality 1902 also includes an input/output module 1910 for receiving various inputs (via input devices 1912), and for providing various outputs (via output devices 1914). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1916 and an associated graphical user interface (GUI) 1918. Other output devices include a printer, a model-generating mechanism, a tactile output mechanism, an archival mechanism (for storing output information), and so on. The computing functionality 1902 can also include one or more network interfaces 1920 for exchanging data with other devices via one or more communication conduits 1922. One or more communication buses 1924 communicatively couple the above-described components together.

The communication conduit(s) 1922 can be implemented in any manner, e.g., by a local area network, a wide area network (e.g., the Internet), point-to-point connections, etc., or any combination thereof. The communication conduit(s) 1922 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1902 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described herein can employ various mechanisms to ensure the privacy of user data collected and/or maintained by the functionality, in accordance with user expectations and applicable laws and norms of relevant jurisdictions. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
by one or more computing devices:
receiving audio, image, or video events that characterize a physical environment sensed by the one or more computing devices, the audio, image, or video events including individual audio, image, or video events characterizing a person that is present in the sensed physical environment;
identifying a triggering cue in the audio, image, or video events that characterize the sensed physical environment;
responsive to identifying the triggering cue in the audio, image, or video events that characterize the sensed physical environment, obtaining a policy associated with the person that is present in the sensed physical environment;
obtaining a certificate associated with the policy and a public key associated with a certificate-originating entity;
determining whether the policy is valid based at least on whether the certificate is decrypted using the public key associated with the certificate-originating entity; and
when the policy is determined to be valid, governing behavior of one or more applications with respect to the individual audio, image, or video information characterizing the person that is present in the sensed physical environment, the behavior being governed by filtering or modifying the individual audio, image, or video events characterizing the person that is present in the sensed physical environment.

2. The method of claim 1, further comprising:
obtaining the certificate from the certificate-originating entity, wherein the certificate-originating entity is a trusted passport authority entity.

3. The method of claim 1, the certificate conferring a right to an individual application with respect to the individual audio, image, or video events characterizing the person that is present in the sensed physical environment.

4. The method of claim 1, further comprising:
successfully decrypting the certificate with the public key associated with the certificate-originating entity; and
determining that the policy is valid responsive to successful decryption of the certificate.

5. The method of claim 1, wherein the determining of whether the policy is valid includes determining whether the audio, image, or video events indicate that the sensed physical environment matches context information identified by the certificate.

6. The method of claim 5, wherein the context information specifies a physical region in which the policy is intended to be applied.

7. The method of claim 1, wherein the one or more applications include an augmented reality application that combines the audio, image, or video events with other information to produce an output presentation representing the sensed physical environment as modified by the other information.

8. The method of claim 1,
wherein the certificate provides executable instructions that, when executed, perform at least one function associated with the policy, and
wherein the method further comprises configuring said one or more computing devices based at least on the executable instructions provided by the certificate.

9. The method of claim 8, wherein the executable instructions, when executed, detect the triggering cue in the audio, image, or video events that characterize the sensed physical environment.

10. The method of claim 1, the triggering cue being present in the individual image, audio, or video information characterizing the person that is present in the sensed physical environment.

11. The method of claim 10, the triggering cue being a badge worn by the person.

12. The method of claim 1, wherein the triggering cue is a sound that identifies the policy.

13. The method of claim 12, wherein the sound is a spoken message sensed by the one or more computing devices, the spoken message identifying the policy.

14. The method of claim 1,
wherein said identifying comprises applying a confidence level to determine whether the triggering cue is present within the sensed physical environment,
the confidence level accommodating a degree of jitter in detection of the triggering cue.

15. The method of claim 1, wherein said identifying comprises detecting the triggering cue and another triggering cue that identifies another policy, using at least two respective recognizers.

16. The method of claim 15, further comprising:
resolving a conflict between the policy and the another policy.

17. One or more computing devices comprising:
one or more storage resources storing instructions; and
one or more processing devices configured to execute the instructions,
the instructions, when executed by the one or more processing devices, causing the one or more processing devices to:
obtain audio, image, or video events that characterize a sensed physical environment using sensor information obtained by at least one sensing mechanism, the audio, image, or video events including audio, image, or video information characterizing an inanimate object that is present in the sensed physical environment;
process the audio, image, or video events to identify a triggering cue in the sensed physical environment that identifies a policy relating to the inanimate object that is present in the sensed physical environment;
receive a certificate associated with the policy;
determine whether the policy is valid based at least on whether the certificate is decrypted using a public key associated with a certificate-originating entity;
responsive to a determination that the certificate is valid, set application permission information based at least on the policy; and
govern behavior of one or more applications based at least on the application permission information by filtering or modifying the audio, image, or video information characterizing the inanimate object that is present in the sensed physical environment before providing the audio, image, or video information characterizing the inanimate object to the one or more applications.

18. The one or more computing devices of claim 17, the instructions, when executed by the one or more processing devices, causing the one or more processing devices to:
provide the audio, image, or video information characterizing the inanimate object to a first application, as specified by the policy; and
prevent a second application from receiving the audio, image, or video information characterizing the inanimate object, as specified by the policy.

19. One or more computing devices comprising:
one or more storage resources storing instructions; and
one or more processing devices configured to execute the instructions,
the instructions, when executed by the one or more processing devices, causing the one or more processing devices to:
obtain audio, image, or video events that characterize a sensed physical environment using sensor information obtained by at least one sensing mechanism;
process the audio, image, or video events to identify a triggering cue that is present in the sensed physical environment and a target feature that is present in the sensed physical environment;
obtain a policy identified by the triggering cue, the policy restricting application access to individual audio, image, or video events that characterize the target feature that is present in the sensed physical environment;
obtain a certificate associated with the policy and determine whether the policy is valid based at least on whether the certificate is decrypted using a public key associated with a certificate-originating entity;
responsive to a determination that the certificate is valid, set application permission information based at least on the policy; and
govern behavior of one or more applications based at least on the application permission information by filtering or modifying the individual audio, image, or video events that characterize the target feature before providing the audio, image, or video events to the one or more applications.

20. The one or more computing devices of claim 19, the individual audio, image, or video events including depth information obtained from a depth camera, the depth information characterizing the target feature.

* * * * *